(12) United States Patent
Katoh et al.

(10) Patent No.: US 7,408,688 B2
(45) Date of Patent: Aug. 5, 2008

(54) METHOD FOR DRIVING OPTICAL DEFLECTING DEVICE ARRAY, OPTICAL DEFLECTING DEVICE ARRAY, OPTICAL DEFLECTING DEVICE, AND IMAGE PROJECTION DISPLAYING APPARATUS

(75) Inventors: Seiichi Katoh, Miyagi (JP); Takeshi Nanjyo, Hyogo (JP); Koichi Ohtaka, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 303 days.

(21) Appl. No.: 11/265,206

(22) Filed: Nov. 3, 2005

(65) Prior Publication Data
US 2006/0109539 A1 May 25, 2006

(30) Foreign Application Priority Data
Nov. 4, 2004 (JP) .............................. 2004-320821

(51) Int. Cl.
*G02B 26/08* (2006.01)
(52) U.S. Cl. ...................... 359/196; 359/197; 359/223; 359/212; 359/227
(58) Field of Classification Search ................. 359/223, 359/224, 226, 212, 203, 227, 290, 291, 292, 359/295, 298, 196, 197
See application file for complete search history.

(56) References Cited

U.S. PATENT DOCUMENTS 6,900,915 B2  5/2005  Nanjyo et al.
6,947,195 B2  9/2005  Ohtaka et al.
2004/0012667 A1  1/2004  Ohtaka et al.
2004/0263936 A1  12/2004  Nanjyo et al.
2004/0263945 A1  12/2004  Nanjyo et al.

(Continued)

FOREIGN PATENT DOCUMENTS

JP  2978285  9/1999
JP  2004-78136  3/2004

OTHER PUBLICATIONS

Patent Abstracts of Japan, JP 2004-078136, Mar. 11, 2004 (reference previously filed in Japanese language on Nov. 3, 2005).

(Continued)

*Primary Examiner*—Ricky L Mack
*Assistant Examiner*—Brandi N Thomas
(74) *Attorney, Agent, or Firm*—Oblon, Spivak, McClelland, Maier & Neustadt, P.C.

(57) ABSTRACT

A method for driving an optical deflecting device array is disclosed, including in a series of processes for the light deflection operation, at least, a state of a first stage writing and recording data for indicating an inclination direction of the plate member to incline in a first inclination direction or a second inclination direction, into a semiconductor memory device arranged immediately under or adjacent to each of the plurality of optical deflecting devices; a state of a second stage switching the inclination direction of the plate member of the arbitrary optical deflecting device to the first inclination direction based on an indication of the data, and deflecting light; and a state of a third stage switching the inclination direction of the plate member of the arbitrary optical deflecting device to the second inclination direction based on the indication of the data, and deflecting light.

4 Claims, 26 Drawing Sheets

U.S. PATENT DOCUMENTS

2005/0168786 A1    8/2005    Nanjyo et al.
2005/0169156 A1    8/2005    Katoh et al.
2005/0179973 A1    8/2005    Nanjyo et al.
2006/0109539 A1    5/2006    Katoh et al.

OTHER PUBLICATIONS

Larry J. Hornbeck, "Deformable-Mirror Spatial Light Modulators", SPIE Critical Reviews Series, vol. 1150, 1989, pp. 86-102.

Peter F. Van Kessel, et al., "A MEMS-Based Projection Display", Proceedings of the IEEE, vol. 86, No. 8, Aug. 1998, pp. 1687-1704.

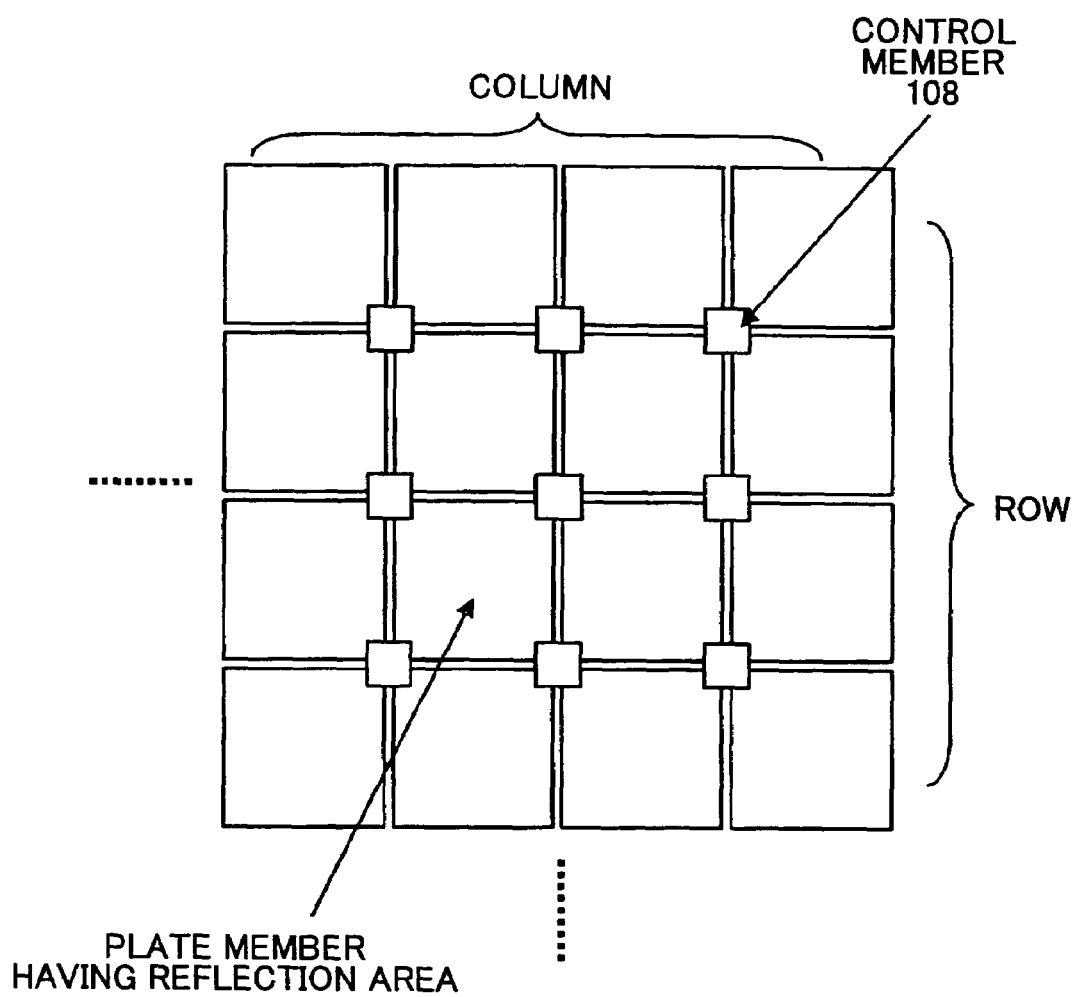

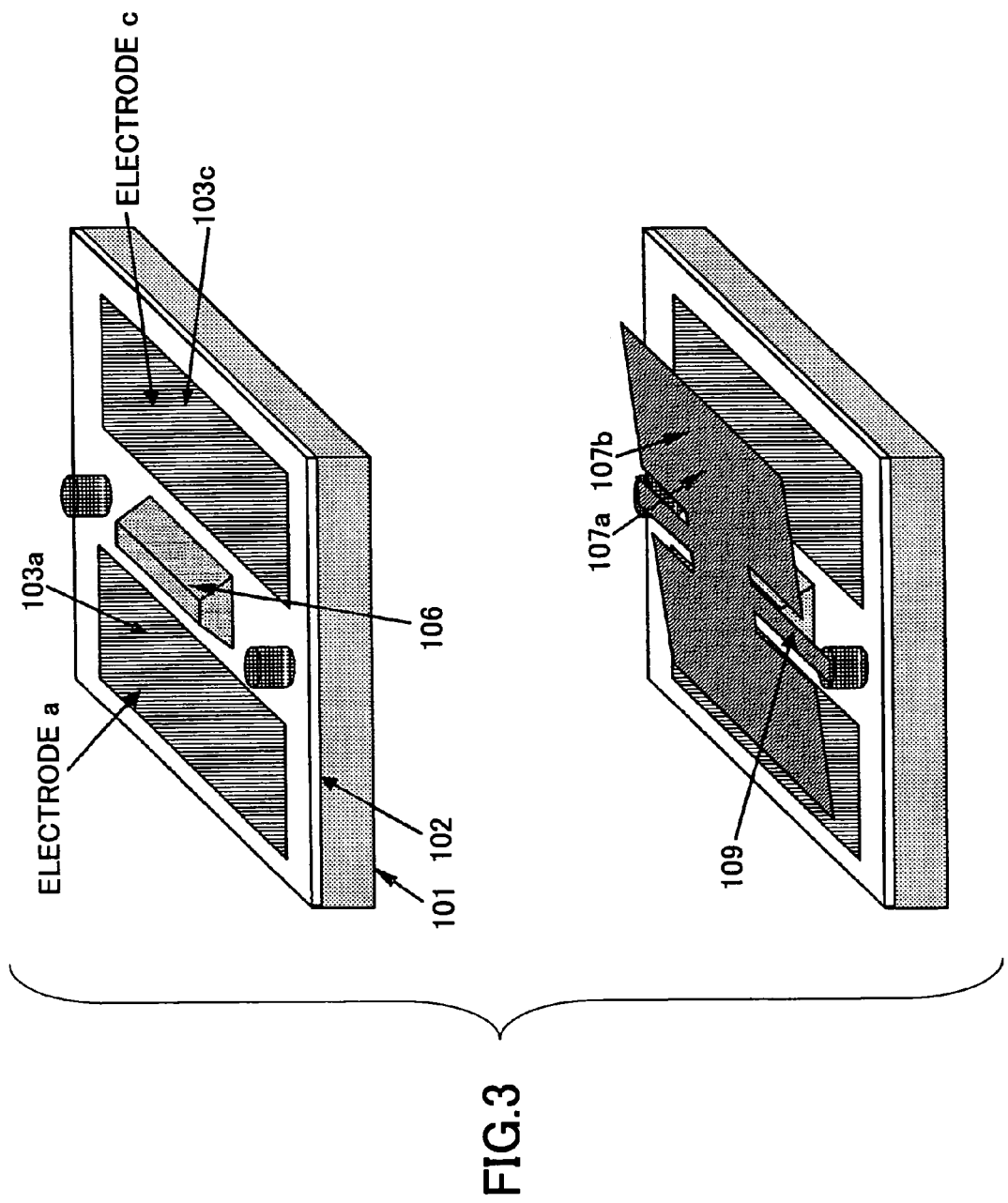

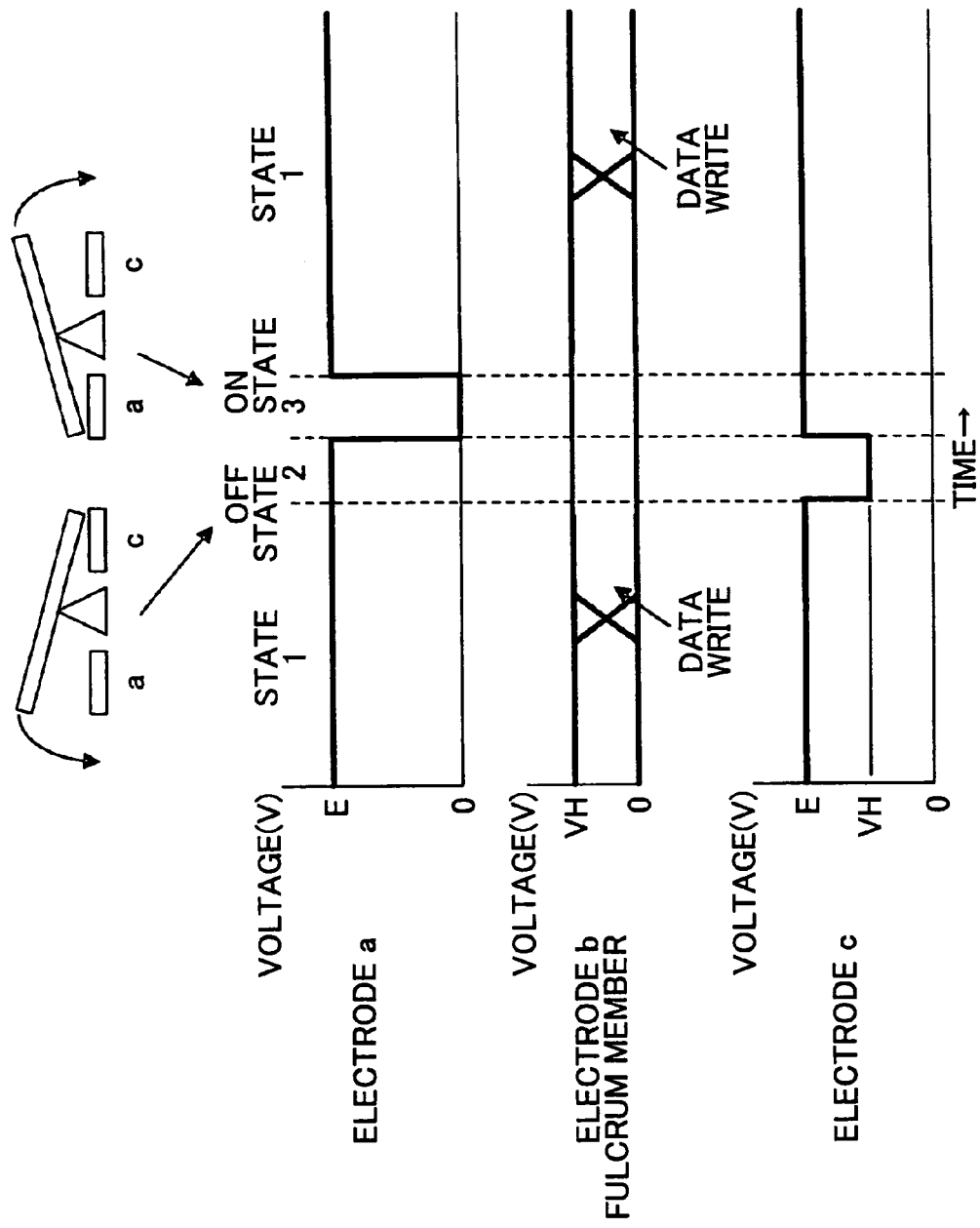

BIT LINE DATA     BIT LINE DATA

P-CHANNEL MOS TRANSISTOR

ROW ADDRESS SIGNAL n-CHANNEL MOS TRANSISTOR n-CHANNEL MOS TRANSISTOR

COLUMN ADDRESS SIGNAL

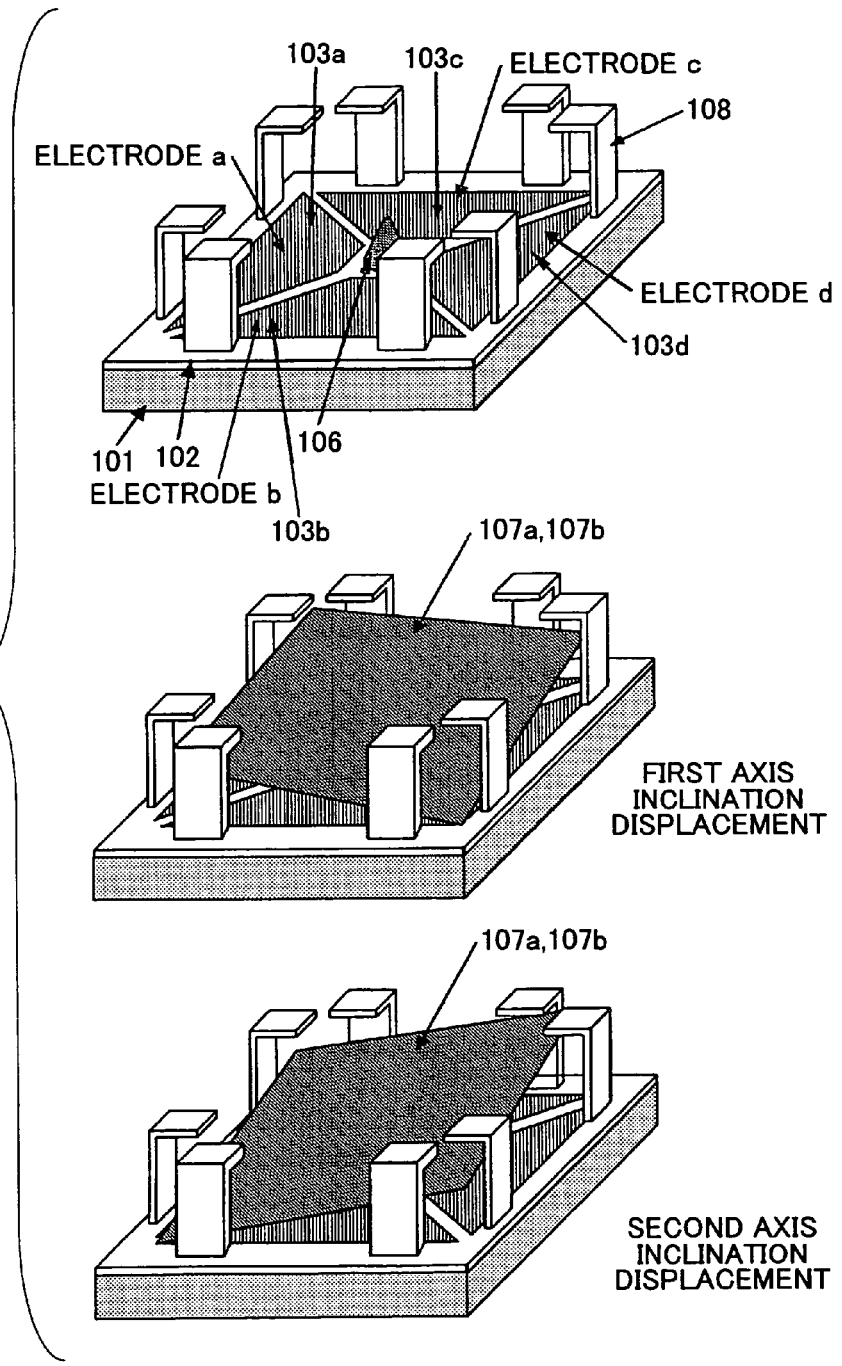

SECOND AXIS ON

φ DIRECTION

SECOND AXIS OFF

-φ DIRECTION

FIG.18
STATE 2
(2-a) 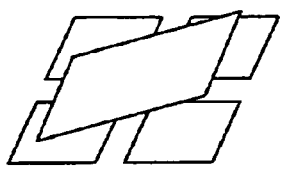
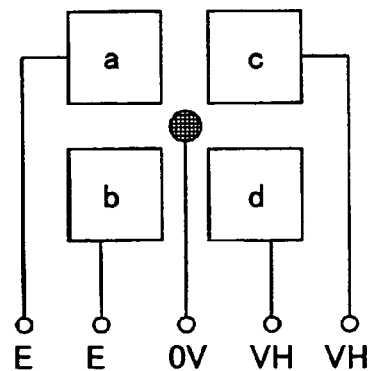
E  E  0V  VH  VH
(2-b) 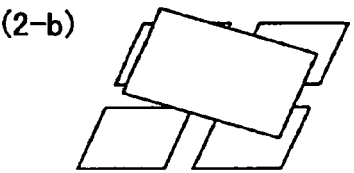
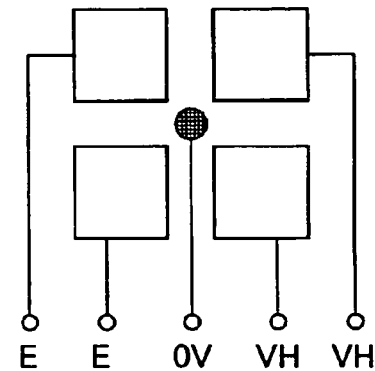
E  E  0V  VH  VH
(2-c) 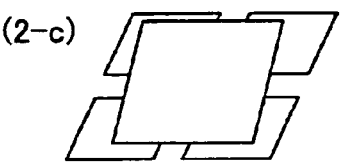
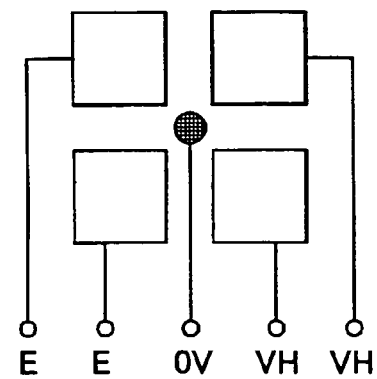
E  E  0V  VH  VH
(2-d) 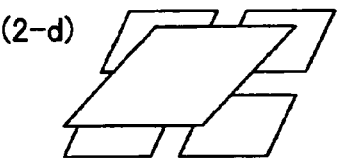
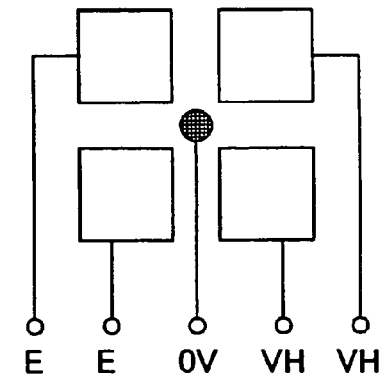
E  E  0V  VH  VH

FIG.20
STATE 3 FIRST AXIS
(3-1-a) 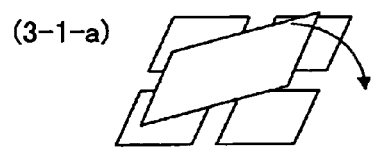
(3-1-b) 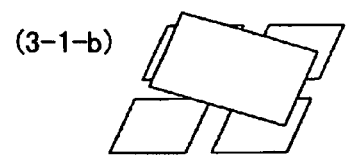
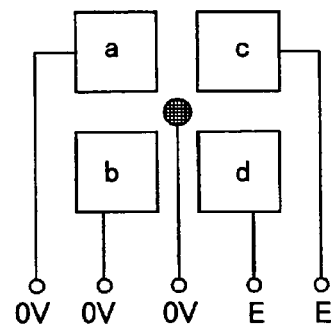
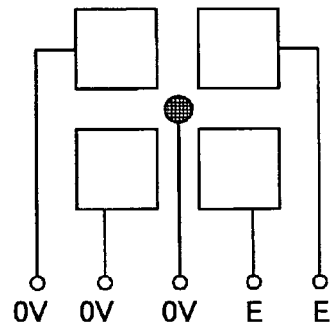
(3-1-c) 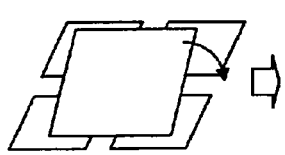
(3-1-d) 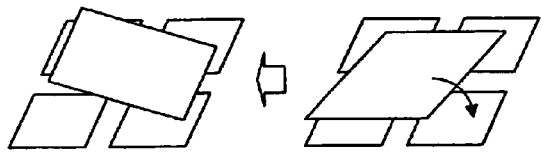
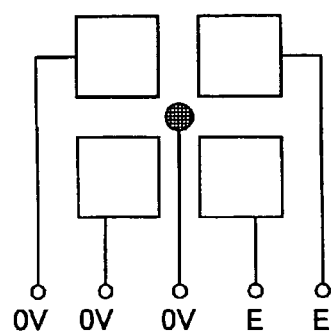
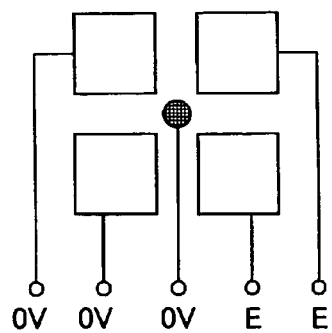

FIG.21
(3-1-e)
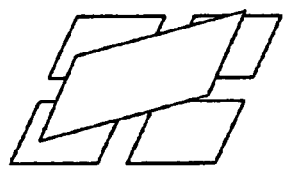
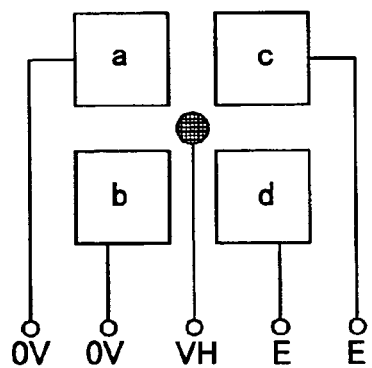
0V  0V  VH  E  E
(3-1-f)
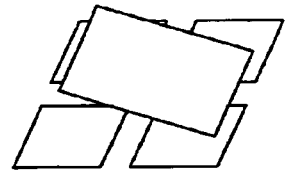
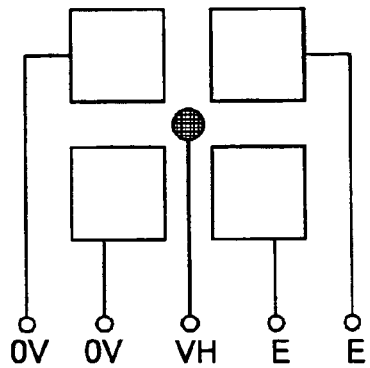
0V  0V  VH  E  E
(3-1-g)
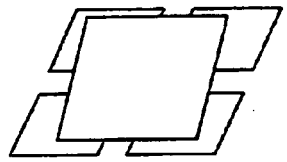
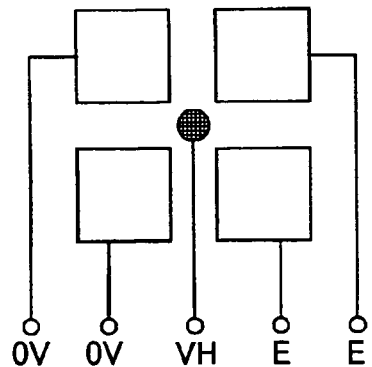
0V  0V  VH  E  E
(3-1-h)
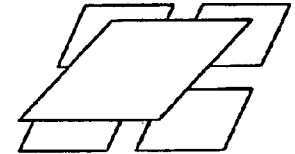
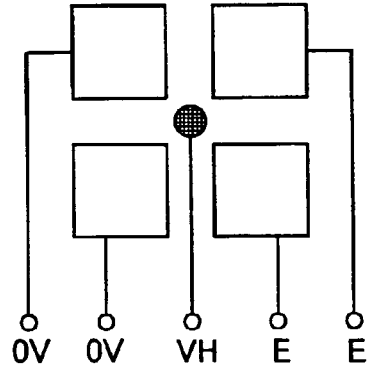
0V  0V  VH  E  E

FIG.22
STATE 3  SECOND AXIS
(3-2-a)              (3-2-b)
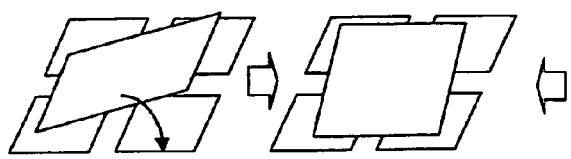 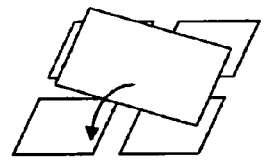
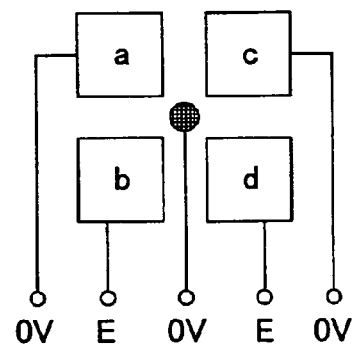 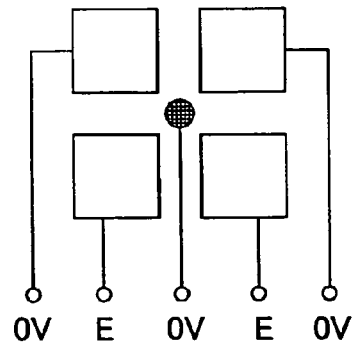
(3-2-c)              (3-2-d)
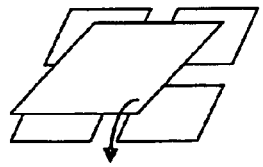 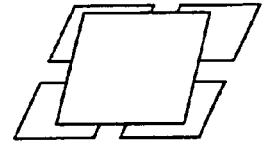
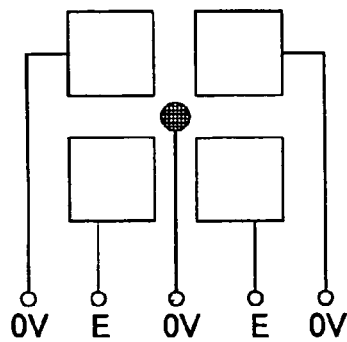 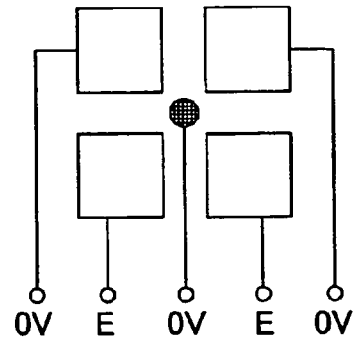

FIG.23
(3-2-e)
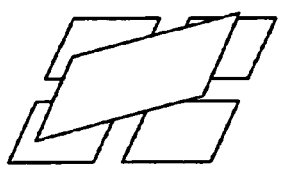
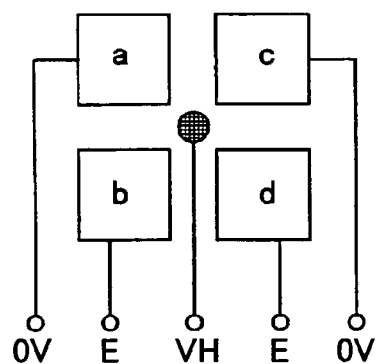
0V  E  VH  E  0V
(3-2-f)
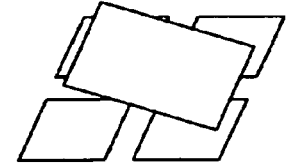
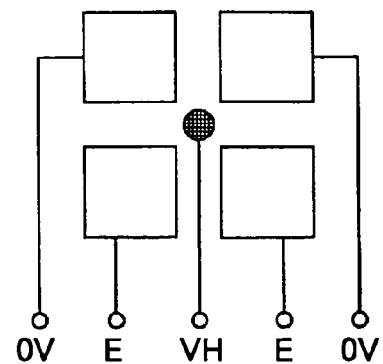
0V  E  VH  E  0V
(3-2-g)
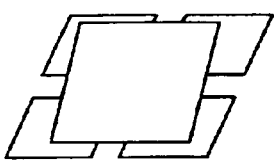
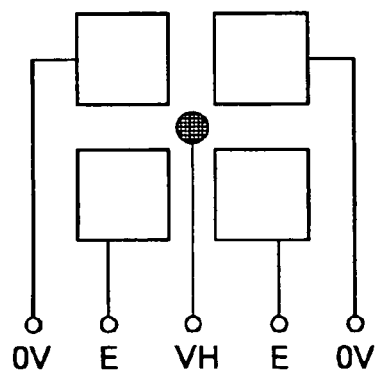
0V  E  VH  E  0V
(3-2-h)
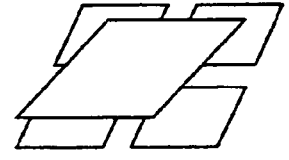
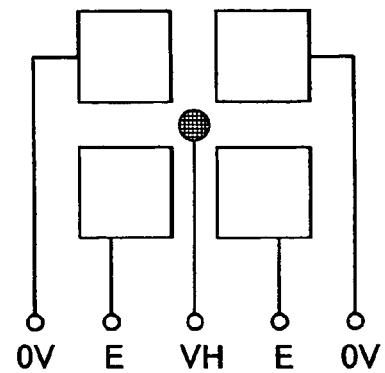
0V  E  VH  E  0V

METHOD FOR DRIVING OPTICAL DEFLECTING DEVICE ARRAY, OPTICAL DEFLECTING DEVICE ARRAY, OPTICAL DEFLECTING DEVICE, AND IMAGE PROJECTION DISPLAYING APPARATUS

BACKGROUND OF THE INVENTION

1. Field of the Invention

The present invention generally relates to a method for driving an optical deflecting device capable of changing a direction an output light with respect to an input light, and for example, relates to a technology suitable for an image forming apparatus such as a printer, a copier, or a like applying of an electrophotographic method, and a projection type image video displaying apparatus such as a projector, a digital theater, or a like.

2. Description of the Related Art

For example, L. J. Hornbeck proposed a digital micromirror device of a torsion beam hinge (see "Proc. SPIE Vol. 1150, pp. 86-102 (1989)"). Moreover, a space light modulator having a micromirror group, in which a technology of the digital micromirror device has been developed, is called a DMD (Digital Micromirror Device), and used in an image projection apparatus (for example, see "Proc. of the IEEE, vol. 86, No. 8, pp. 1687-1704 (1998)").

These devices are supported by torsion beams in which a mirror is generally called a hinge. By using the hinge, a reflection area can be reduced. On the other hand, in the described-above DMD, a reflection member is provided to a surface in addition to a hinge portion, and a two-step structure. Moreover, although a voltage to actually drive becomes dozens of volts by using the hinge, in order to control with 5V through 7.5V as data for switching an inclination direction, an inclination switch is conducted by combining a bias voltage being dozens of volts being simultaneously applied to a plurality of pixels and restoration force of a special spring member.

Moreover, as described in Proc. SPIE Vol. 1150, pp. 86-102 (1989), a driving method for changing an electronic potential of a mirror is disclosed. Compared with a monostable operation, a bidirectional operation of a mirror having a larger deflection angle is advantageous. In order to acquire a bistability, a hinge being rigidly connected to a mirror is used. The above-described driving method proposes a method for changing a voltage of an electrode facing to the mirror simultaneously with a voltage of the mirror.

In addition, the applicant of the present invention previously proposed the following optical deflecting device. That is, Japanese Laid-open Patent Application No. 2004-78136 discloses an optical deflecting device for changing an electrostatic attraction corresponding to an electric potential being applied to a member having a light reflection area, and changing a reflection direction of an incoming light flux and deflecting the incoming light flux entering the light reflection area, the optical deflecting device including a substrate; a plurality of controlled members; a fulcrum member; and a plate member 107a, wherein each of the plurality of control members has a stopper at an upper portion, and the plurality of control members are respectively arranged at a plurality of edges of the substrate; the fulcrum member includes an apex configured by a conductive member, and is arranged on an upper surface of the substrate; the plate member does not have a fixed end, but has the light reflection area on an upper surface of the plate member, has a conductive layer formed by a member partially being conductive at least, is configured by a member having a conductive contact point at least contacted to the apex of a rear surface of the plate member, is movably arranged in a space formed by the substrate, the fulcrum member, and the stopper, and wherein an electric potential of the plate member is applied by a contact with the fulcrum member, an arbitrary electric potential is applied to each of the plurality of electrodes so that a maximum electric potential difference becomes greater than a predetermined voltage, and an electric potential applied to the apex is set to be equal to either one of a maximum value and a minimum value which are applied to the plurality of the electrodes.

A spatial light modulator or an optical deflecting device using the above-described hinge has restoration force due to stiffness, and a drive voltage becomes up to dozens of volts. On the other hand, high precision is desired for a high definition television set, a high resolution television set, and a like. In a case of increasing the number of pixels, a chip size becomes larger, a process flow becomes specialized, and a material cost is increased. Accordingly, it is required to minimize the size of a mirror forming a pixel. Consequently, a stiffness of the hinge suspending the mirror becomes greater, and the drive voltage is increased. Moreover, in a case of minimizing the size of the mirror, it is not easy to reduce the stiffness due to a limitation of precision of a micro process to thin down the hinge. Even if its usage is not required to be minimized, the hinge is bent down in a case of reducing the stiffness and the drive voltage. As a result, a center position of the mirror cannot be maintained. Also, in a case of using the hinge, the hinge is formed on a surface of the mirror. Then, an area for reflecting light is reduced.

Accordingly, a reflective surface is formed on a driving electrode, and a double structure is formed. This configuration increases the reflection area and becomes complicated. Therefore, in a case of a configuration using the hinge, minimizing causes that a device configuration becomes complicated and manufacturing costs increase.

Moreover, as a method for conducting a bistable operation using a hinge, Japanese Laid-open Patent Application No. 5-150173 discloses a method for switching an inclination of a mirror by cooperatively actuating a first electric potential of the mirror and an electric potential of an electrode. A beam is a torsion beam, and the restoration force of the stiffness of the hinge is mandatory to be used. There is a problem that the mirror as a beam cannot rotate without a torque. In a case in that an inclination direction of the mirror is changed, when a switch signal is input to either one of two-way directions, a direction is similarly changed. However, in order to switch an inclination direction by an electric potential of approximately 5V that is generally an operation voltage of an LSI (Large Scale Integration), since there is an unstable state due to a balance between a stiff restoration force and an electrostatic force, a switch of the inclination direction is limited to a narrow range of the driving voltage. Furthermore, it is difficult to combine with the LSI which operates at approximately 3.3V as the driving voltage. Also, there is another problem in that the beam immediately operates when data are written. This occurs since a display period is influenced if a data write is delayed. In addition, in the configuration using the hinge, an inclination is made based on one axis alone by using the hinge. As a result, an light deflection is made based on one-axis direction alone.

On the other hand, in the optical deflecting device (disclosed in Japanese Laid-open Patent Application No. 2004-78136), a plate member having a light reflection area does not have a fixed end such as a hinge or a hinge being less rigid is used, it is possible to easily conduct a bistable switch. Electrodes electrically contacted to a conductive layer of the plate member and electrodes facing to the plate member are divided into two groups with respect to a fulcrum member, an arbitrary electric potential is applied to each of electrode groups, and an electric potential of the electrodes electrically contacted to the conductive layer of the plate member is switched. Accordingly, it is possible to easily switch an inclination direction of the plate member.

Moreover, in a configuration in which the plate member does not have a fixed member such as a torsion beam, the inclination direction of the plate member can be changed based on two axes by a configuration of the electric potential being applied to a plurality of electrodes. Since stiffness of the torsion beam is not used, further precision can be easily realized.

However, even in a case in that a control electric potential applied to each of the electrode groups is a direct driving voltage and an LSI memory is used, if a response time of the plate member is less than 5 μsec., a voltage of more than 10V is required. In a case of configuring an image displaying apparatus by combining with the LSI memory, a dedicated driving device of a higher voltage is required.

SUMMARY OF THE INVENTION

It is a general object of the present invention to provide a method for driving an optical deflecting device array capable of controlling an inclination direction of a plate member with a low voltage generally required as an operation voltage of an LSI memory circuit, an optical deflecting device array, an optical deflecting device, and an image projection displaying apparatus, in which the above-mentioned problems are eliminated.

A more specific object of the present invention is to provide a method for driving an optical deflecting device array, which arranges a plurality of optical deflecting devices in one dimension or in two dimensions, each of the plurality of optical deflecting devices in which a plate member having a light reflection area rotates on a rotation axis or a fulcrum being as a center, and a light deflection operation is conducted by changing a reflection direction of an incoming light flux in that the plate member includes a conductive layer, an electrode is contacted or fixed to the conductive layer to apply an electric potential, and each of the plurality of optical deflecting device includes an electrode group including a plurality of electrodes arranged to face to the plate member, and switching an inclination direction of the plate member due to an electrostatic attraction caused by an electric potential difference between an arbitrary electrode in the electrode group and the electrode applying the electric potential to the conductive layer, said method including: in a series of processes for the light deflection operation, at least, a state of a first stage writing and recording data for indicating an inclination direction of the plate member to incline in a first inclination direction or a second inclination direction, into a semiconductor memory device arranged immediately under or adjacent to each of the plurality of optical deflecting devices; a state of a second stage switching the inclination direction of the plate member of the arbitrary optical deflecting device to the first inclination direction based on an indication of the data, and deflecting light; and a state of a third stage switching the inclination direction of the plate member of the arbitrary optical deflecting device to the second inclination direction based on the indication of the data, and deflecting light.

BRIEF DESCRIPTION OF THE DRAWINGS

In the following, embodiments of the present invention will be described with reference to the accompanying drawings.

FIG. 2 is a diagram showing an example of arranging optical deflecting devices according to the present invention in a two-dimensional array;

FIG. 3 is a first variation of the first embodiment of the present invention;

FIG. 11 is a diagram showing a timing chart according to the first embodiment of the present invention;

FIG. 14 is a diagram showing a variation of the second embodiment of the present invention;

FIG. 18 is a diagram for explaining the operations in the state 1 through the state 2 according to the second embodiment of the present invention;

FIG. 20 is a diagram for explaining the operations in the state 1 through the state 2 according to the second embodiment of the present invention;

FIG. 21 is a diagram for explaining the operations in the state 1 through the state 2 according to the second embodiment of the present invention;

FIG. 22 is a diagram for explaining the operations in the state 1 through the state 2 according to the second embodiment of the present invention;

FIG. 23 is a diagram for explaining the operations in the state 1 through the state 2 according to the second embodiment of the present invention;

DESCRIPTION OF THE PREFERRED EMBODIMENT

Figure 1A:
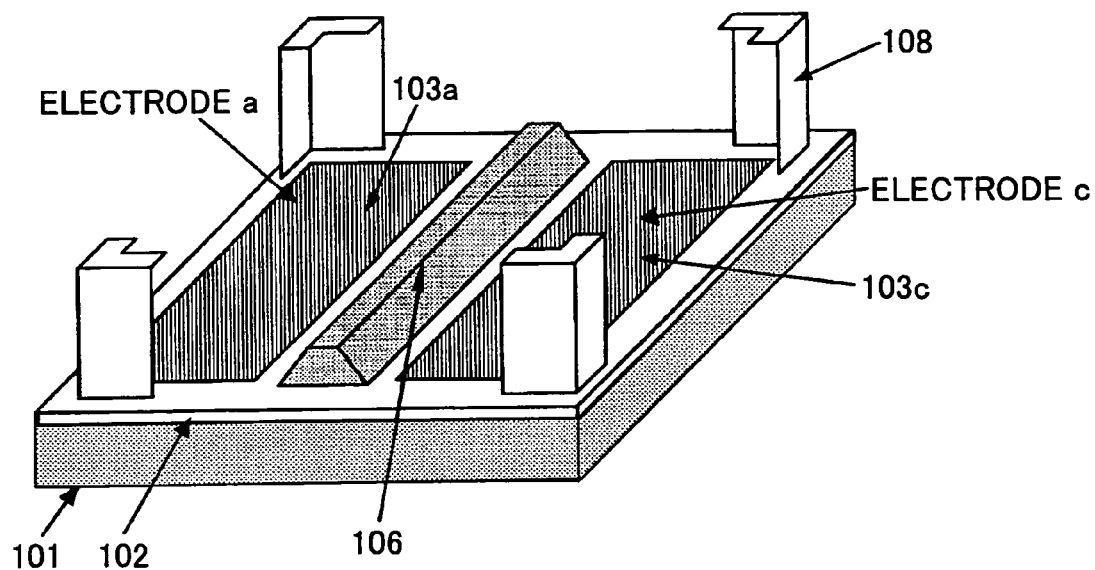
FIG. 1 is a diagram showing a configuration according to an embodiment of the present invention.

In the following, an embodiment of the present invention will be described with reference to the accompanying drawings.

In a conventional method for driving an optical deflecting device array, in order to rotate a plate member and switch an inclination direction, a low voltage is required. However, in a method for driving an optical deflecting device array according to the present invention, it is possible to control the inclination direction of the plate member with a low voltage generally required as an operation voltage of the LSI memory circuit.

A principal of the present invention will be described as follows. The plate member having a reflection area is inclined with respect to a fulcrum member. A plurality of electrodes facing toward the plate member are divided into two groups with respect to the fulcrum member. For example, a low electric potential of a regular output of an LSI semiconductor memory device is applied to a first electrode group, which is at a side where the plate member inclines. A high electric potential of a conductive layer of the plate member is applied to the conductive layer of the plate member. A high electric potential within a range to sufficiently rotate the plate member is applied to a second electrode group which has a wider space for the plate member.

However, since the plate member is distanced from the electrodes, an electrostatic force becomes weak. An electric potential difference of the electrostatic force between the first electrode group at the side where the plate member inclines and the plate member, but the electrostatic force is strong since the first electrode group is closer to the plate member. Thus, a longer interval of the electric potential within a range in which a rotation is not occurred is set to the second electrode group which electrodes are distance from the plate member. In a case in that the electric potential of the conductive layer of the plate member is the low electric potential of the LSI, the electric potential difference becomes 0V between the first electrode group at the side where the plate member inclines the conductive layer of the plate member, and the electrostatic force does not work. In this case, since the electrostatic force is greater between the plate member and the second electrode group at a side of the longer interval of the electric potential, the plate member can be inclined in a direction to which the electrostatic force is greater.

As described above, even in a case of a low voltage such as the electric potential of the LSI semiconductor memory device, it is possible to drive and control an inclination of the plate member with a high voltage. The greater the electric potential difference between the plate member and the electrodes, the shorter a response time of an inclination displacement. Accordingly, it is possible to drive the inclination of the plate member at higher speed. Moreover, it is possible to further decrease the voltage to be lower than 3.3V. It is possible to minimize a semiconductor memory device such as the LSI combined with the optical deflecting device. It is possible to further minimize the shape of the plate member. It is possible to integrate an optical deflecting device array with a higher density.

In the method for driving the optical deflecting device using the above-described mechanism according to the present invention, there are the following three states. First, in the present invention, the plate member inclines in an OFF inclination direction when light is OFF, and the plate member inclines in an ON inclination direction when light is ON.

(1) in a display period in that as a pixel for forming an image, the plate member is maintained in the ON inclination direction or the OFF inclination direction during an indicated period, data determining ON or OFF are written and recorded.

(2) the plate member is inclined in the OFF inclination direction when OFF is indicated, or the plate member is maintained to be in the ON inclination direction when ON is indicated.

(3) the plate member is inclined in the ON inclination direction in response to an ON signal. In a case in that OFF is indicated, an inclination direction is not changed, and OFF is maintained.

And, goes back to the above (1), and the inclination direction is maintained and the image is displayed.

For example, if the method for driving the optical deflecting device array according to the present invention is applied to a method for displaying a gradation of the pixel in a time length of ON or OFF, it is possible to express an image by using a state 1 as a period corresponding to the gradation.

As described above, in the present invention, it is possible to overcome the problem in which it is difficult to minimize the size of the optical deflecting device using the hinge, by operating the plate member which does not have a fixed portion, in accordance with the method for driving the optical deflecting device array. In addition, the plate member which does not have the fixed portion can be inclined based on one of two axes, and light entering from two directions can be output by switching to one direction. Accordingly, it is possible to form the optical deflecting device capable of switching light to select one of two colors, and outputting the light.

In the method for driving the optical deflecting device according to the present invention, even in a two-axis deflection, it is possible to control the inclination direction of the plate member at the low voltage, which is approximately 5V of data output in a regular semiconductor memory device such as the LSI, and it is possible to simultaneously switch a display with a plurality of pixels. If the present invention is used for a projector, it is possible to overcome a problem of color breaking that occurs in a single-plate optical deflecting device since a color switch is conducted for each of the plurality of pixels.

First Embodiment

Figure 1B:
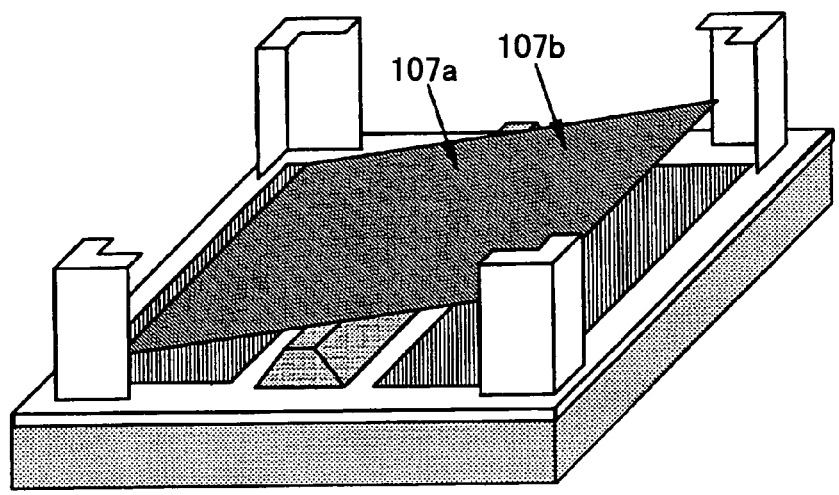

FIG. 1A and FIG. 1B are diagrams showing a configuration according to a first embodiment of the present invention. Electrode groups 103a and 103c including a plurality of electrodes are arranged on a substrate 101 through an insulation film 102, and the electrodes are covered with an insulation film. Moreover, a plate member 107a having a light reflection area of a conductive layer 107b of the plate member 107a are mounted on a fulcrum member 106. A conductor is exposed at an apex of an electrode of the fulcrum member 106, and the apex is electrically contacted to a conductive layer of the plate member 107a. Accordingly, it is possible to apply the electric potential to the conductive layer 107b of the plate member 107a from the electrode of the fulcrum member 106.

The plate member 107a can conduct a certain amount of a rotation (inclination), and each control member 108 suppresses a movement so that the plate member 107a does not jump out. An inclination angle of the plate member 107a is an angle obtained by calculating an arcsine of ½ of a length of the plate member 107a and a height of the fulcrum member 106 adjacent to the plate member 107a.

The plate member 107a is displaced to incline to either one of an electrode a or an electrode c as a result of comparing an electrostatic force by the conductive layer 107b and the electrode group 103a (electrode a) with another electrostatic force by the conductive layer 107b and the electrode group 103c (electrode c). Moreover, even if the conductive layer 107b of the plate member 107a is temporarily distanced from an electrode electrically connected on the substrate 101, the conductive layer 107b of the plate member 107a holds an electric charge, and an equivalent electrostatic force works. All the electrostatic force are not out of force. In addition, since the electrostatic force works, it is possible for the plate member 107a to contact to an electrode side again.

As shown in FIG. 2, a plurality of the optical deflecting devices according to the present invention can be arranged in a two dimensional array, and can be used, for example, as a light bulb of a displaying apparatus such as a projector.

FIG. 3 is a diagram showing a configuration example of the optical deflecting device in that the plate member 107a and the conductive layer 107b are partially used as a torsion beam hinge 109, and the plate member 107a is suspended by the torsion beam hinge 109. In this configuration example, since stiffness of the torsion beam hinge 109, and the torsion beam hinge 109 is dangled, the torsion beam hinge 109 is supported by the fulcrum member 106. In a case in that the stiffness of the torsion beam hinge 109 is weak and a voltage is not applied to the electrodes, the plate member 107a and the conductive layer 107b are inclined.

As described as Japanese Laid-open Patent Application No. 2004-78136, the optical deflecting device according to the present invention can be fabricated based on a semiconductor fabricating process. Preferably, on the same substrate 101, active element groups for a drive are arranged on a lower layer, and the electrode groups including the plurality of electrodes and the plate member 107a are multiply layered. Alternatively, a substrate of the active element groups and a substrate forming the electrode groups and the plate member 107a can be bonded together.

In the first embodiment, the plate member 107a is formed by a conductive member, and the electric potential of the conductive layer 107b of the plate member 107a is defined as the electric potential of the plate member 107a. In a case in that the plate member 107a is configured by an insulation layer and a conductive layer, the electric potential of the conductive layer of the plate member 107a is defined as the electric potential of the plate member 107a.

An operation principal in the method for driving the optical deflecting device array according to the present invention will be described. The plate member 107a is not fixed by fixing members such as torsion beams, and does not have a restoration force due to stiffness. Alternatively, the plate member 107a is suspended by the torsion beam having weak stiffness. The plate member 107a is inclined by the fulcrum member 106. A distance between the plate member 107a and the electrodes at the side where the plate member 107a inclines is much shorter than a distance between the plate member 107a and the electrodes at an opposite side. The electrode groups are classified into an electrode group far from the plate member 107a and an electrode group closer to the plate member 107a.

Since the electrostatic force is in inverse proportion to a square of a distance, even if a predetermined low voltage is applied between the plate member 107a and the electrodes at the side where the plate member 107a inclines, the plate member 107a can be pulled by the electrostatic force. Overwhelming this electrostatic force, another electrostatic force working between the plate member 107a and the electrodes at the opposite side with respect to the fulcrum member 106 can be set not to be greater since the distance between the plate member 107a and the electrodes at the opposite side. That is, even if the electric potential difference is smaller in the electrostatic force between the plate member 107a and the electrodes having the shortest average distance, the electrostatic force can be greater than another electrostatic force between the plate member 107a and the electrodes having a longer distance to the plate member 107a. For example, in a case in that the inclination angle is 10°, when the same electric potential difference is applied to close electrodes to the plate member 107a and far electrodes from the plate member 107a, the electrostatic force working at the close electrodes is approximately dozen times to several hundred times greater than the far electrodes.

Compared by using voltage, since the electrostatic force is in proportion to a square of voltage, a difference of the electrostatic forces working at the close electrodes and the far electrodes becomes several times or dozen times. For example, if it is assumed to be 10 times, for example, the electrostatic force in a case of applying 5V to the plate member 107a and the close electrodes is approximately equal to the electrostatic force in a case of applying 50V to the plate member 107a and the far electrodes. If 5V is applied to the plate member 107a, 0V is applied to the electrode a when the plate member 107a inclines to a side of the electrode a, and 20V is applied to the electrode c, the electrostatic force between the electrode a and the plate member 107a is greater than the electrostatic force between the electrode c and the plate member 107a. This method for driving the optical deflecting device can be used for a spatial light modulator having a mirror using a torsion beam. In addition, even if stiffness of the torsion beam is relatively weak, an operation can be conducted.

Figure 4:
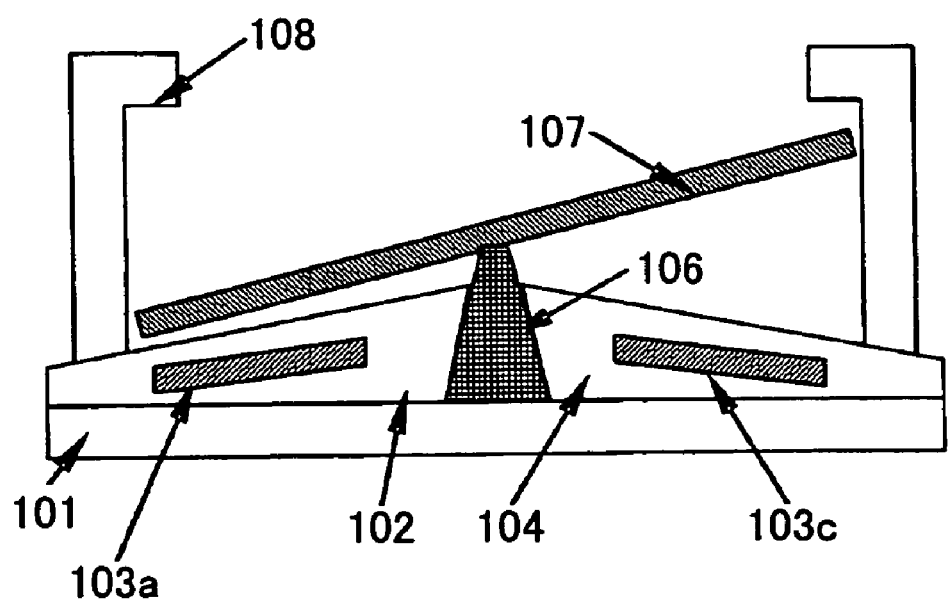
FIG. 4 is a second variation of the first embodiment of the present invention.

FIG. 4 is a diagram showing a variation of the first embodiment of the present invention. In FIG. 4, the electrodes 103a and 103c facing to a plate member 107a are inclined with respect to the substrate 101. By making the electrodes 103a and 103c closer to the plate member 107a, it is possible to increase the electrostatic force. Accordingly, for example, a ratio of the electrostatic force between the plate member 107a and the electrode 103a at an inclination side where the plate member 107a inclines to the electrostatic force between the plate member 107a and the electrode 103c at the far side distanced from the plate member 107a can be improved to be several hundred times, for example, 400 times. A voltage ratio can be improved to be a few dozen times, for example, 20 times.

By this configuration, in a case of applying 3.3V between the plate member 107a and the electrode 103a closer to the plate member 107a, even if a voltage up to 66V is applied between the plate member 107a and the electrode 103c far from the plate member 107a, the plate member 107a does not change the inclination direction. The method for driving the optical deflecting device array according to the present invention can be used in a case in that the operation voltage is 3.3V for a high density LSI including the semiconductor memory device. Since the operation voltage of a highly integrated LSI is lower, if the driving voltage is lower, an optical deflecting device including a storage device such as SRAM (Static Random Access Memory) can be minimized.

In the following, a method for controlling the plate member 107a by using the semiconductor memory such as the LSI in the above-described configuration will be described. The LSI is combined to control the plate member 107a. In general, the operation voltage for the LSI is 5V. In the following, VH denotes a high value (high electric potential) of a signal voltage of the LSI, and for example, is illustrated as 5V. However, the present invention is not limited to a voltage of 5V, and the same method can be used in a case of 3.3V or 2V. In general, a low electric potential VL is 0V. Thus, a case of VH=5V, VL=0V, and E=20V will be illustrated.

In light deflection, a light OFF state is defined as a case in that the plate member 107a inclines to the side of the electrode a, and a light ON state is defined as a case in that the plate member 107a inclines to the side of the electrode c and light is reflected in a predetermined direction.

The electrode a and the electrode c are symmetrically arranged and have the same size of an area. For example, when the plate member 107a inclines to the side of the electrode a, it shows approximately 50 as the ratio of the electrostatic force between the plate member 107a and the electrode a to which the plate member 107a inclines to the electrostatic force between the plate member 107a and the electrode c distanced from the plate member 107a. Since force is proportional to a square of a voltage, a voltage ratio is a square root of the force. Thus, the voltage ratio of the electrostatic force becomes 7.0 times. Since the high electric potential VH is 5V, when the electric potential difference is 5V between the electrode a and the plate member 107a, the plate member 107a maintains inclining to the side of the electrode a until the electric potential difference is approximate 35V between the plate member 107a and the electrode c. Thus, the voltage can be used until 35V, but 30V is defined as an electric potential E.

Next, the method for driving the optical deflecting device array according to the present invention will be broadly described. A first inclination direction is defined in a case in that the plate member 107a inclines to the side of the electrode a, light is turned OFF, and a state becomes an OFF state. A second inclination is defined in a case in that the plate member 107a inclines to the side of the electrode c, light is turned ON when the light is reflected and output at the plate member 107a, and the state becomes an ON state.

A state 1 is a period for a display. Also, the state 1 is a state of writing and recording data for indicating the inclination direction of the plate member 107a. However, the inclination direction for the display is maintained.

A state 2 (OFF execution) is a state in that the plate member 107a is inclined in the first inclination direction in accordance with OFF information written and recorded in the state 1, and the state 2 shows an OFF state. In a case in that the plate member 107a has been already turned OFF, the state 2 remains as it is. On the other hand, in a case in that the plate member 107a is indicated to be ON, the inclination direction of the plate member 107a is not changed, and the state 2 remains as the ON state.

A state 3 (ON execution) is a state in that the plate member 107a is inclined in the second inclination direction in accordance with ON information written and recorded in the state 1, and the state 2 shows the ON state. In a case in that the plate member 107a has been already turned ON, the state 3 remains as it is. On the other hand, in a case in that the plate member 107a is indicated to be OFF, since the plate member 107a has been already turned OFF, the state is maintained.

The state becomes the state 1 again. Data are displayed, and data indicating the inclination direction are written and recorded. This state transition is conducted for the entire or a part of optical deflecting devices forming the optical deflecting device array, all at once.

A case example will be described to use the method for driving the optical deflecting device array according to the present invention in a case of conducting a gradation display based on a time length of ON or OFF in the state 1. However, the present invention is not limited to use it for this gradation display. For example, such as a maximum display period, half the maximum display period, one quarter the maximum display period, one eighth the maximum display period, and a like, bits are formed by reducing by half, and gradation can be displayed by combining bits of these periods. Eight bits are used for 256 gradations. In this case, when three colors are depicted by using a single optical deflecting device using a color wheel, for example, a minimum display period is approximately 20 μsec.

Advantageously, in the method for driving the optical deflecting device array according to the present invention, by data written in the state 1, it is possible to switch between an OFF display and ON display with respect to multiple pixels simultaneously in the state 2 and the state 3. The state 2 and the state 3 can be a few μsec., and the state transition is sufficiently fast, so that human eyes cannot recognize the state transition. As described above, since the plate member 107a does not switch the inclination direction while data are being written, there is no time lag caused by ON or OFF pixels. Also, there is no influence to the minimum display period.

Figure 5:
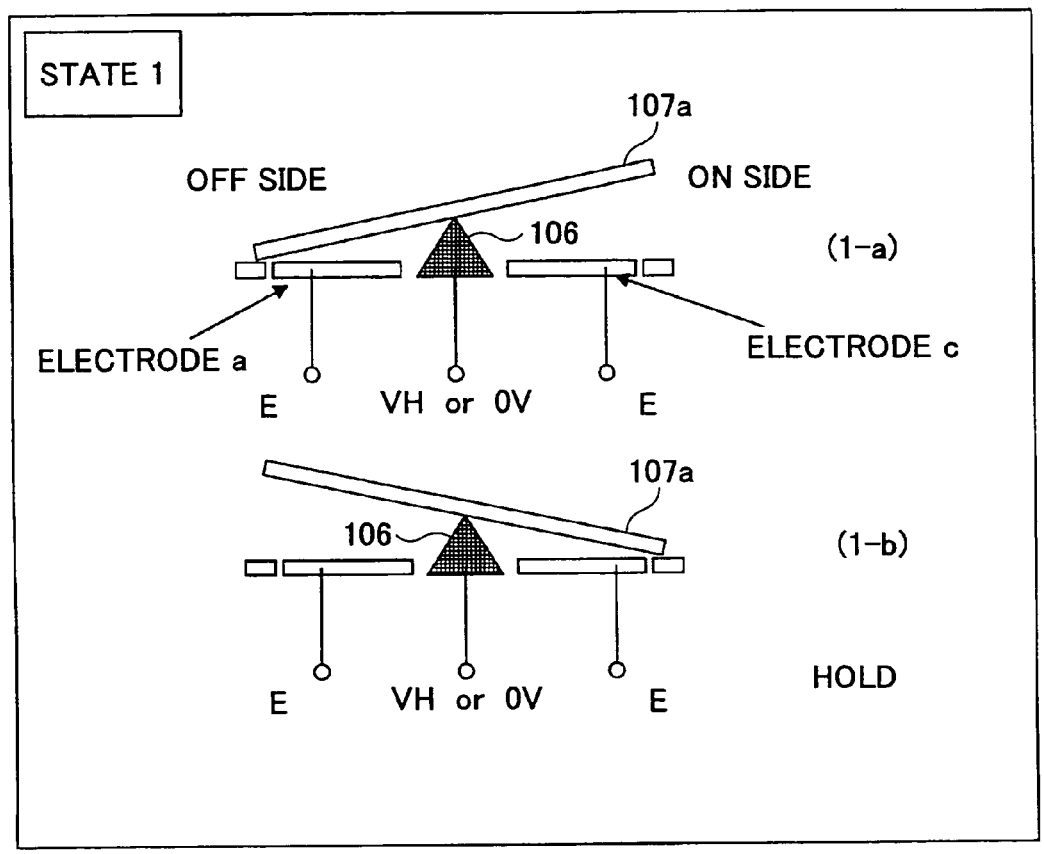
FIG. 5 is a diagram for explaining an operation according to the first embodiment of the present invention.
Figure 6:
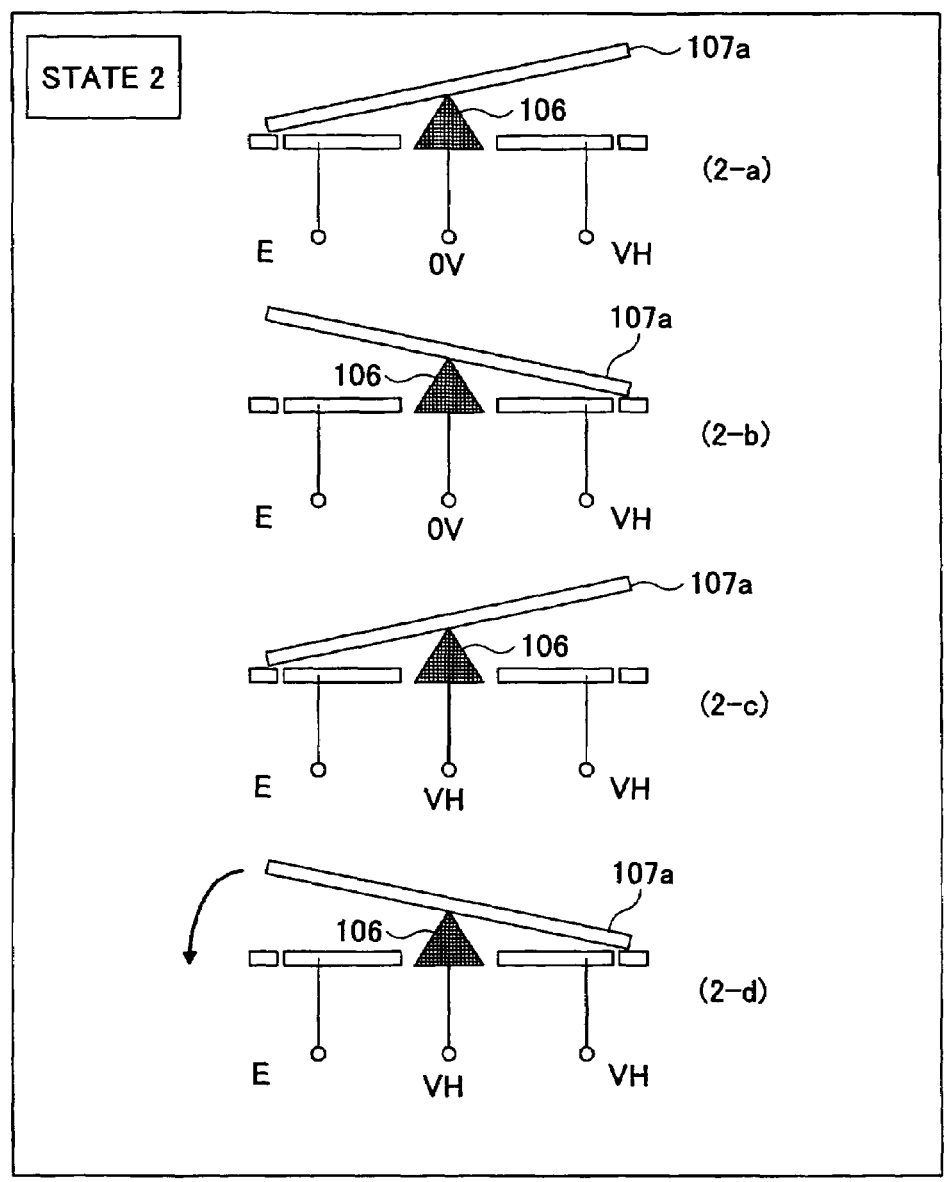
FIG. 6 is a diagram for explaining the operation according to the first embodiment of the present invention.
Figure 7:
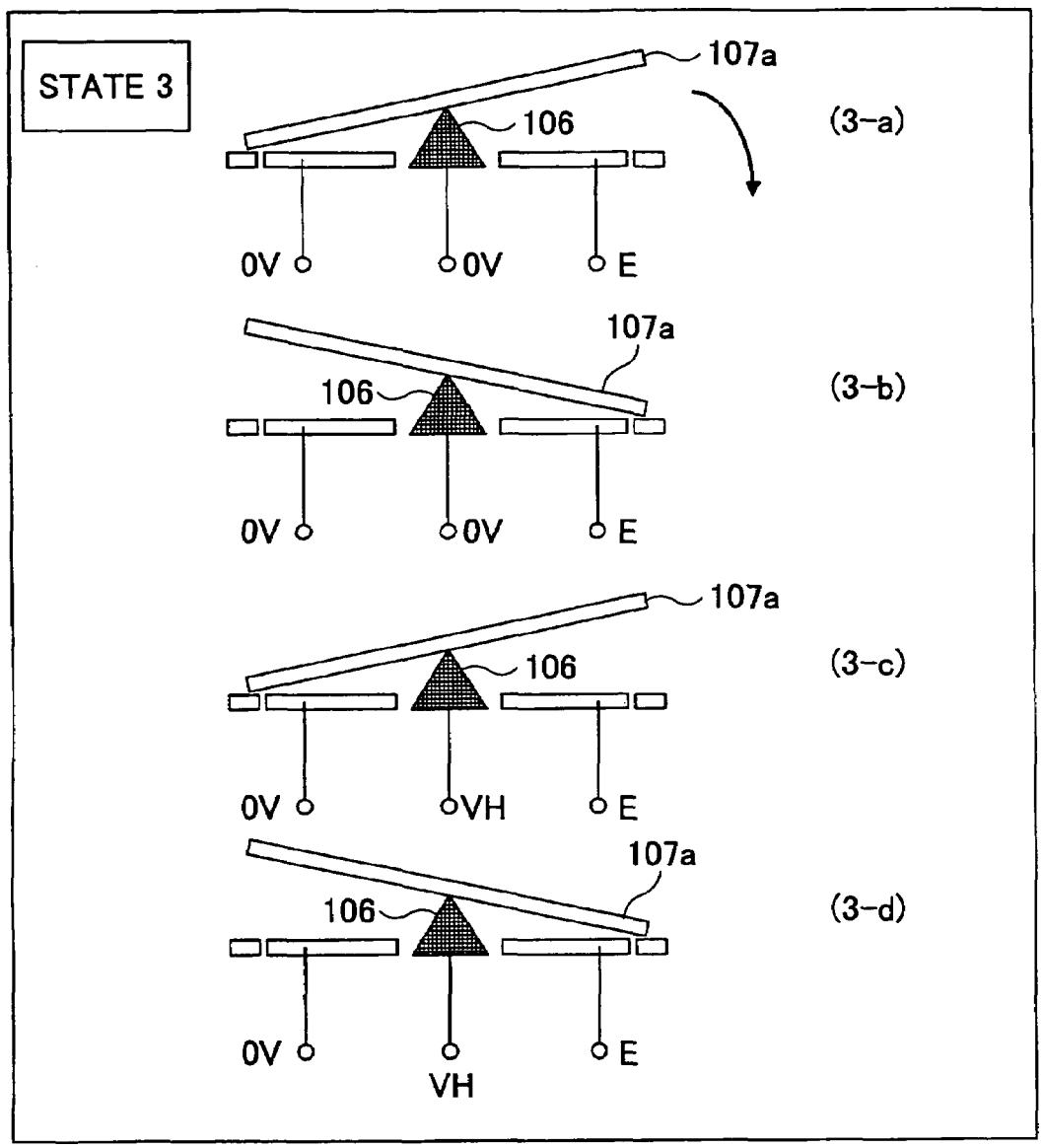
FIG. 7 is a diagram for explaining the operation according to the first embodiment of the present invention.

Next, an operation of the electric potential of each electrode will be described for each state. FIG. 5, FIG. 6, and FIG. 7 are diagrams showing the electric potential and an inclination state of the plate member 107a, and for explaining the operation of the electric potential of each electrode. The first inclination direction is defined to the side of the electrode a, and an electrode arranged in the first inclination direction is defined as the electrode a. The second inclination direction is defined to the side of the electrode c, and an electrode arranged in the second inclination direction is defined as the electrode c.

Each electric potential of the electrode a and the electrode c is set as described as follows. However, in a case of applying to the optical deflecting device array, it is preferable to simultaneously change the electric potentials for each of the plurality of the optical deflecting devices forming the optical deflecting device array.

In accordance with a condition 1, the electric potentials to apply to the plate member 107a are defined as V1=VL=0V, and V2=VH.

State 1 (FIG. 5) (0V is applied to the plate member 107a when the ON information is written, and VH is applied to the plate member 107a when the OFF information is written):

First, it is assumed that the plate member 107a inclines to the side of the electrode a. The electric potential E (E<VL or E>VH+α, α is required to be greater than the electric potential in which the electrostatic force between the plate member 107a and the electrode a becomes greater than the electrostatic force between the plate member 107a and the electrode c) is applied to the electrode a, the electric potential E is applied to the electrode c, and 0V or VH is applied to the plate member 107a. An electric potential difference is E or E−VH between the plate member 107a and the electrode a. In addition, since a distance is shorter, the electrostatic force at the side of the electrode a is stronger than the side of the electrode c, and the plate member 107a remains to incline at the side of the electrode a, regardless of the electric potential 0V or VH.

(1-a) the plate member 107a inclines to the first inclination direction.

At an electric potential V3=E which is applied to the electrode a, with respect to both an electric potential V1=0V as a low electric potential of the plate member 107a and an electric potential V2=5V as a high electric potential, the electrostatic force works due to an electric potential difference V3−V1=E or V3−V2=E−VH, and an inclination of the plate member 107a is maintained.

(1-b) the plate member 107a inclines in the second inclination direction.

At an electric potential V4=E which is applied to the electrode c, with respect to both the electric potential V1=0V as the low electric potential of the plate member 107a and the electric potential V2=5V as the high electric potential, the electrostatic force works due to an electric potential difference V4−V1=E or V4−V2=E−VH, and an inclination of the plate member 107a is maintained.

State 2 (FIG. 6) (the OFF information is executed. (2-a) and (2-b) show the plate member 107a in a case in that the ON information is written in the state 1, and (2-c) and (2-d) show the plate member 107a in a case in that the OFF information is written in the state 1.):

The electric potential of the electrode a is V3, and the electric potential of the electrode c is V4=V2 (condition 2).

(2-a) when the plate member 107a inclines in the first inclination direction, the electric potential V3=E is applied to the electrode a, and the electric potential V4=VH is applied to the electrode c, the electric potential of the plate member 107a is V1=0V, the electric potential difference between the plate member 107a and the electrode a is E and the electrostatic force thereof is F1, and the electric potential difference between the plate member 107a and the electrode c is VH and the electrostatic force thereof is F2. The electric potential difference E is significantly greater than the electric potential difference VH. The plate member 107a is closer to the electrode a, and the plate member 107a is farther from the electrode c. Since F1>F2, the plate member 107a maintains inclining in the first inclination direction.

(2-b) the plate member 107a inclines in the second inclination direction, the plate member 107a is farther from the electrode a, and the plate member 107a is closer to the electrode c. The electric potential of the plate member 107a is V1=0V. The electric potential difference between the plate member 107a and the electrode a is E. However, since the plate member 107a is farther from the electrode a, the electrostatic force F1 becomes weaker. On the other hand, the plate member 107a is closer to the electrode c, and the electric potential difference is VH. However, the electrostatic force F2 can be greater. It is possible to set the electric potential difference E where F1<F2, and the plate member 107a maintains inclining in the second inclination direction.

(2-c) the plate member 107a inclines in the first inclination direction, the electric potential of the plate member 107a is V2=VH, and the electrostatic force F3 due to the electric potential difference E−VH between V3 and V2 becomes greater while the plate member 107a becomes closer to the electrode a. The electric potential difference between V4 and V2 is 0V and the electrostatic force F4=0 does not work. Since F3>F4, the plate member 107a inclines in the first inclination direction.

(2-d) the plate member 107a inclines in the second inclination direction, the electric potential difference between V3 and V2 is E−VH, and the electrostatic force F3 occurs. The electric potential difference between V4 and V2 is 0V, and F4=0. Since F3>F4, the inclination direction of the plate member 107a switches from the second inclination direction to the first inclination direction.

State 3 (FIG. 7) (the ON information is executed. (3-a) and (3-b) show the plate member 107a in a case in that the ON information is written in the state 1, and (3-c) and (3-d) show the plate member 107a in a case in that the OFF information is written in the state 1.): in this case, the electric potential of the electrode a is V5=V1=0V (condition 2), and the electric potential of the electrode c is V6=E.

(3-a) the plate member 107a inclines in the first inclination direction. The electric potential of the plate member 107a is V1=0V, and the electric potential difference between V5 and V1 is 0V. The electrostatic force between the plate member 107a and the electrode a is F5=0, and the electrostatic force F6 occurs due to the electric potential difference E between V6 and V1. Since F5<F6, the inclination direction of the plate member 107a switches from the first inclination direction to the second inclination direction.

(3-b) the plate member 107a inclines in the second inclination direction. The electric potential of the plate member 107a is V1=0V, and the electric potential difference between V5 and V1 is 0V. The electrostatic force between the plate member 107a and the electrode a is F5=0, the electrostatic force F6 occurs due to the electric potential between V6 and V1, and the plate member 107a maintains inclining in the second inclination direction.

(3-c) the plate member 107a inclines in the first inclination direction. The electric potential of the plate member 107a is V2=VH, the electric potential difference between V5 and V1 is VH. The electrostatic force F7 works between the plate member 107a and the electrode a. The electric potential difference between V6 and V2 is E−VH, and the electrostatic force F8 becomes smaller between the plate member 107a and the electrode c since the plate member 107a becomes farther from the electrode c. It is possible to set F7>F8, and the plate member 107a maintains inclining in the first inclination direction.

(3-d) the plate member 107a inclines in the second inclination direction. The electric potential of the plate member 107a is V2=VH, and the electric potential difference between V5 and V1 is VH. In addition, the plate member 107a is far from the electrode a, and the electrostatic force F7 is small. The electric potential difference between V6 and V2 is E−VH, and the electrostatic force F8 between the plate member 107a and the electrode c becomes greater since the plate member 107a becomes farther from the electrode c. It is possible to set F7>F8, and the plate member 107a maintains inclining in the second inclination direction.

Figure 8:
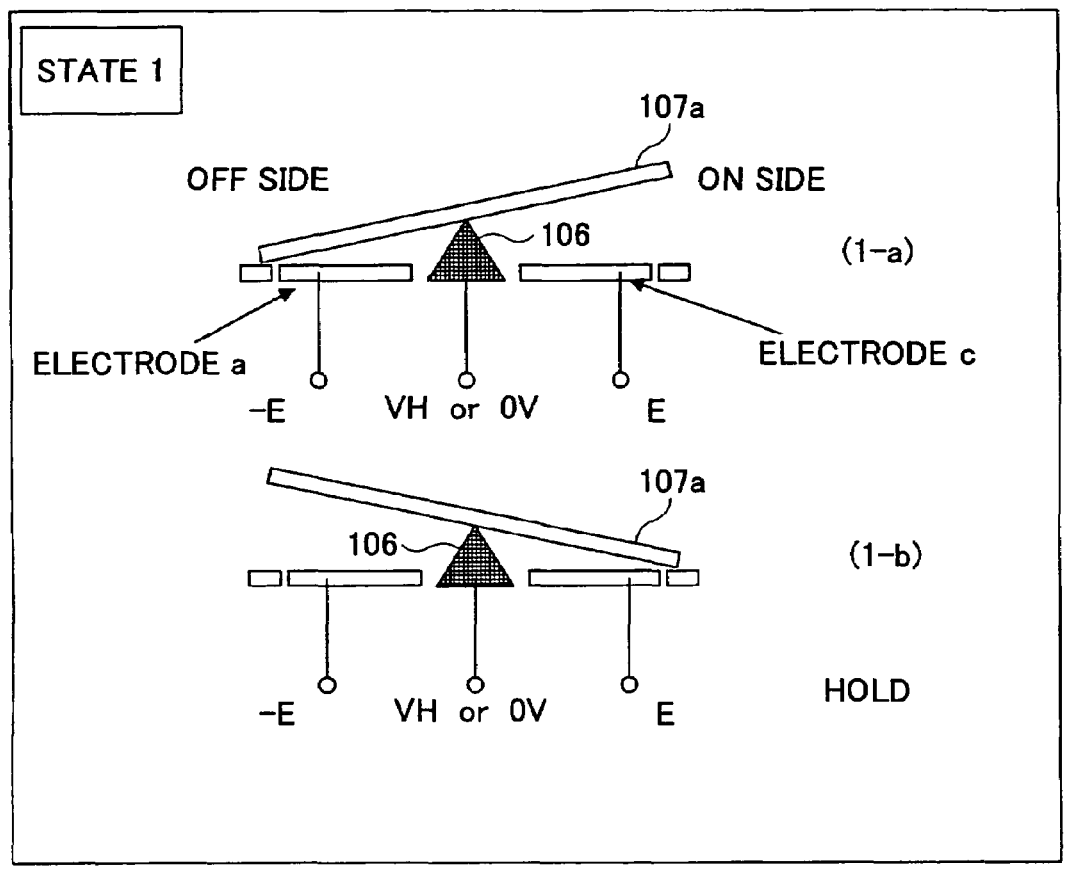
FIG. 8 is a diagram for explaining a variation of the operation according to the first embodiment of the present invention.
Figure 9:
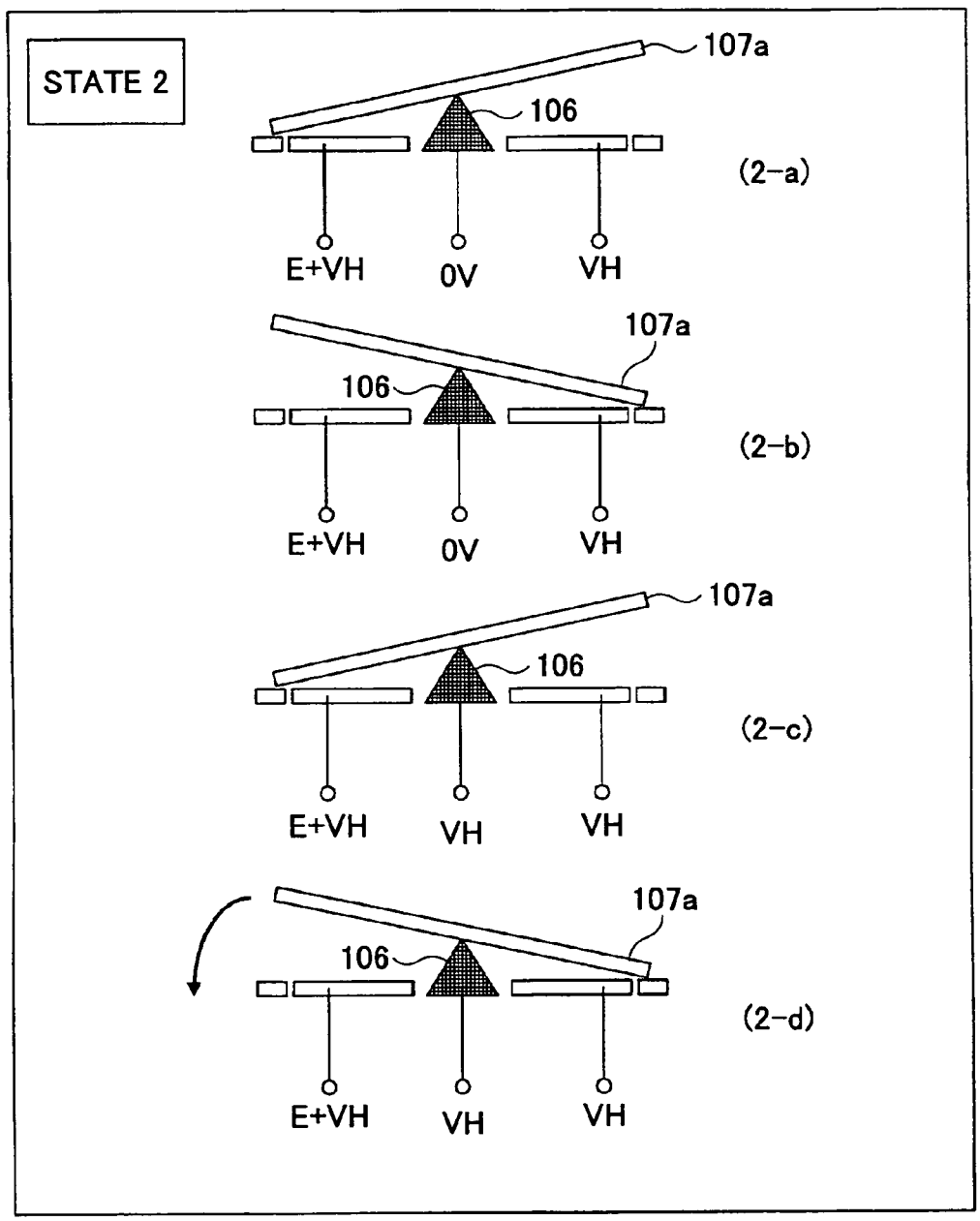
FIG. 9 is a diagram for explaining the variation of the operation according to the first embodiment of the present invention.
Figure 10:
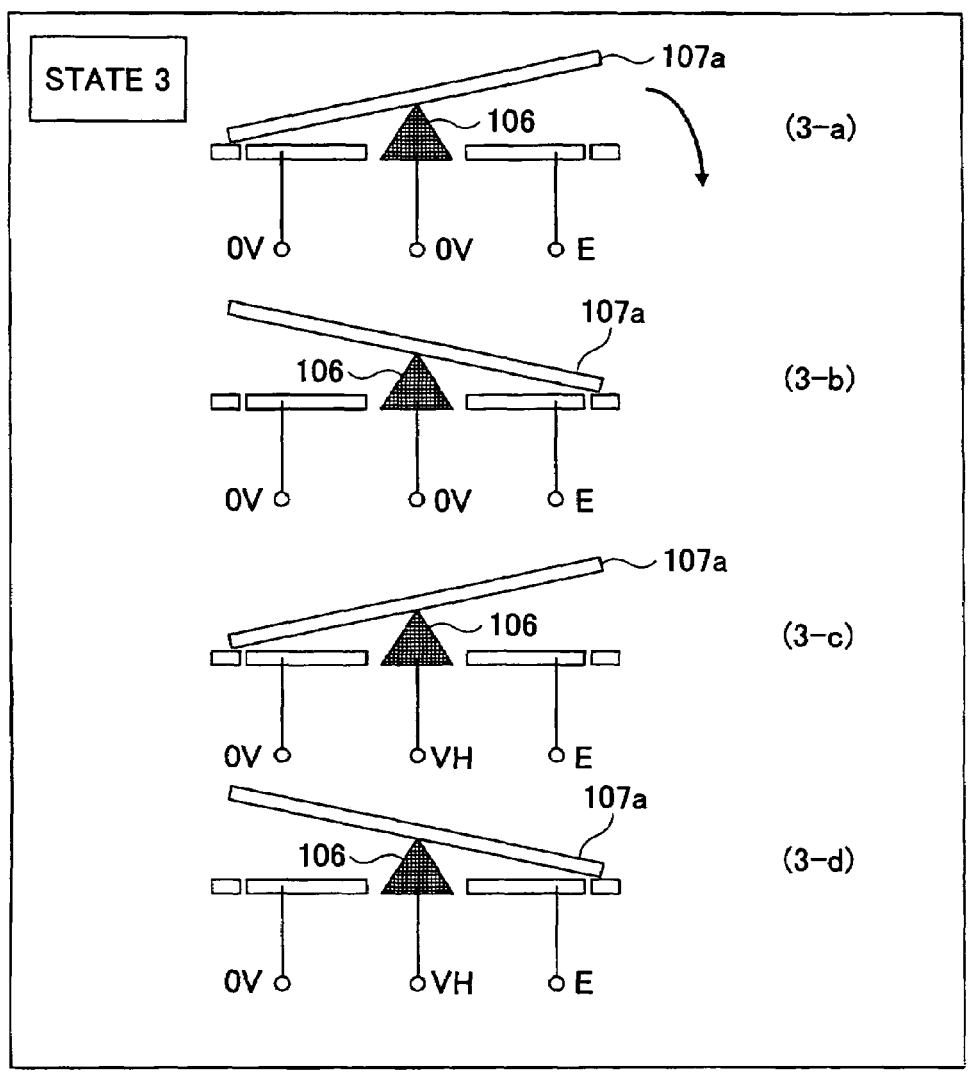
FIG. 10 is a diagram for explaining the variation of the operation according to the first embodiment of the present invention.

FIG. 8, FIG. 9, and FIG. 10 are diagrams showing a variation according to the present invention. As shown in FIG. 8, in the state 1, by setting the electric potential of the electrode a to be lower than VL=0V such as −E, the electrostatic force is caused to the plate member 107a by an electrostatic induction with E of the electrode c, so that the plate member 107a can be gravitated to a substrate side. By this configuration, it is possible for the plate member 107a to further stably maintain a state against disturbance such as vibration. In the state 2 (FIG. 9), E is set to be E+VH, so that the same electrostatic force of the state 3 in FIG. 7 can be used.

FIG. 11 is a timing flowchart for transiting from the state 1 to the states 2, 3, and 1. In FIG. 11, light is OFF when the plate member 107a inclines to the side of the electrode a, and the light is ON when the plate member 107a inclines to the side of the electrode c. In FIG. 11, "ON" and "OFF" indicate the inclination direction of the plate member 107a corresponding to a light ON and a light OFF, respectively. A lateral axis shows time. A longitudinal axis shows electric potentials of electrodes. From a top in FIG. 11, a voltage change of the electrode a in a time sequence, an electric potential change applied to the plate member 107a due to the fulcrum member 106 being conductive in the time sequence, and a voltage change of the electrode c in a time sequence are shown.

Since the electric potential of the plate member 107a changes to be 0V or VH based on data, a timing of writing data to change the electric potential is shown by crossed lines. In this example, the state transits in an order of the state 1, the state 2, the state 3, and the state 1. Alternatively, the order can be of the state 1, the state 3, the state 2, and the state 1. A boundary of the state is shown by a dashed line.

In the state 1, a display is conducted based on image data, and ON data or OFF data to display in a next state 1 are written by 0V or VH, respectively. The ON data are written by applying 0V as the electric potential of the plate member 107*a* ((1-b) in FIG. 5). The OFF data are written by applying VH as the electric potential of the plate member 107*a* ((1-a) in FIG. 5).

In the state 2, in accordance with an indication of the OFF data written in the state 1, the plate member 107*a* is inclined to an OFF side ((2-d) in FIG. 6). In a case in that the OFF data are indicated in the state 1 but the plate member 107*a* has been already inclined at the OFF side, the state is maintained as it is ((2-c) in FIG. 6). In a case in that the ON data are indicated in the state 1, the inclination direction is maintained ((2-a) and (2-b) in FIG. 6).

In the state 3, in accordance with in indication of the ON data written in the state 1, the plate member 107*a* is inclined to an ON side ((3-a) in FIG. 7). In a case in that the ON data are indicated in the state 1 but the plate member 107*a* has been already inclined to the ON side, the state is maintained as it is ((3-b) in FIG. 7). In a case in that the OFF data are indicated in the state 1, the inclination direction is maintained ((3-c) and (3-d) in FIG. 7).

While maintaining the inclination direction in the state 1, data for the next state 1 are written.

During the time length of the light ON state or the light OFF state, the method for driving the optical deflecting device array can be used in a method for conducting the gradation of the display. In particular, it is preferred to arrange the optical deflecting device according to the present invention on a memory device as a semiconductor memory device formed on a substrate of a semiconductor, a ceramics such as a glass, a plastic, or a like, and connect an output of the memory device to the optical deflecting device. A configuration example will be described in that the electric potential of the plate member 107*a* is set as an output electric potential level of the memory device, and becomes VH as the high electric potential or 0V of the low electric potential. As the memory device, an SRAM, a DRAM (Dynamic Random Access Memory), a flash memory, and a like can be used.

Figure 12A:
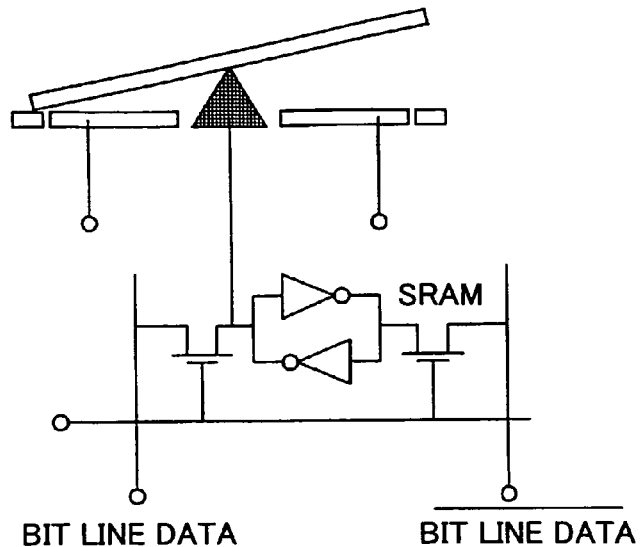
FIG. 12 is a diagram showing a configuration example of maintaining an electric potential of a plate member according to the first embodiment of the present invention.
Figure 12B:
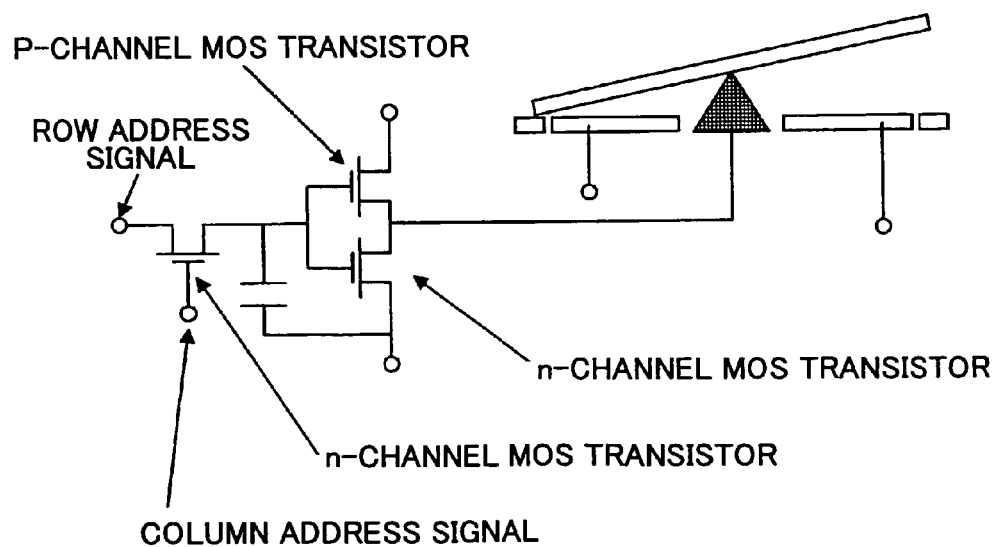

FIG. 12A is a diagram showing a configuration example using the SRAM. An output of the SRAM is connected to the fulcrum member 106 electrically connected to the plate member 107*a*. FIG. 12B is a diagram showing a circuit example having a function of the DRAM in which a capacitor is arranged at a gate of a transistor, and the electric potential is maintained by charging the capacitor.

Second Embodiment

Next, a two-axis operation will be described as one of features in the method for driving the optical deflecting device array.

Figure 13:
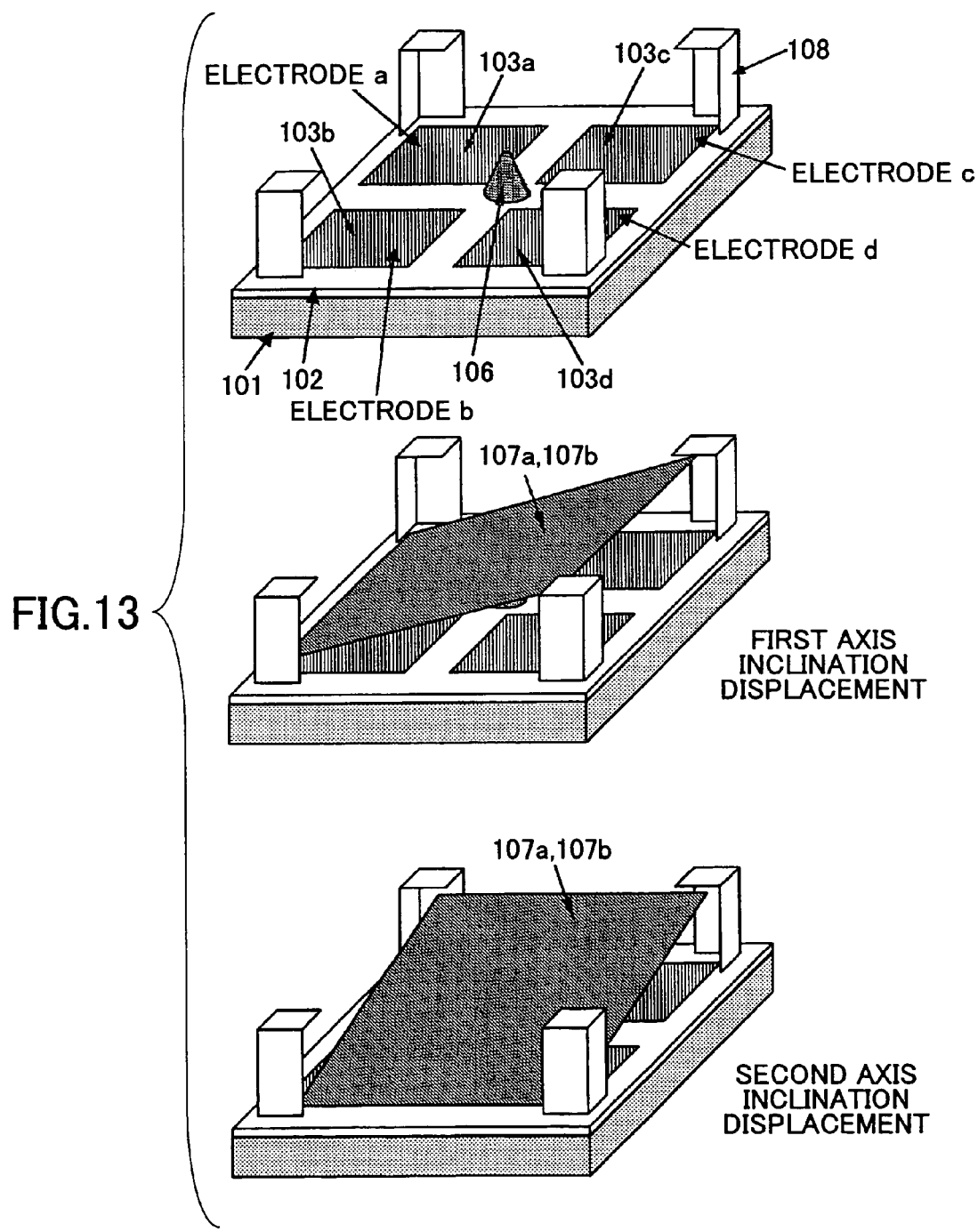
FIG. 13 is a diagram showing a configuration according to a second embodiment of the present invention.
Figure 15A:
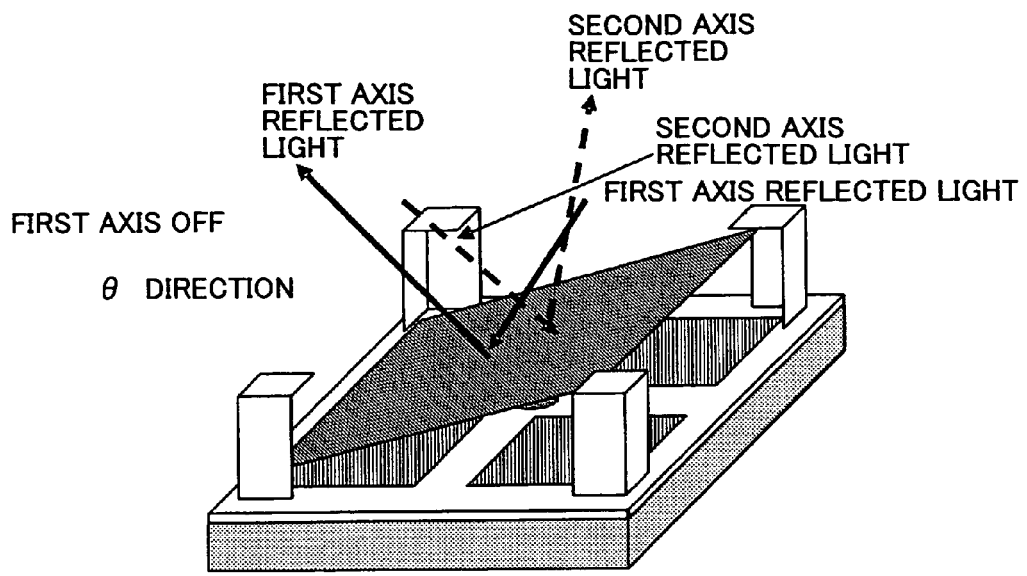
FIG. 15 is a diagram for explaining an optical deflection operation according to the second embodiment of the present invention.
Figure 15B:
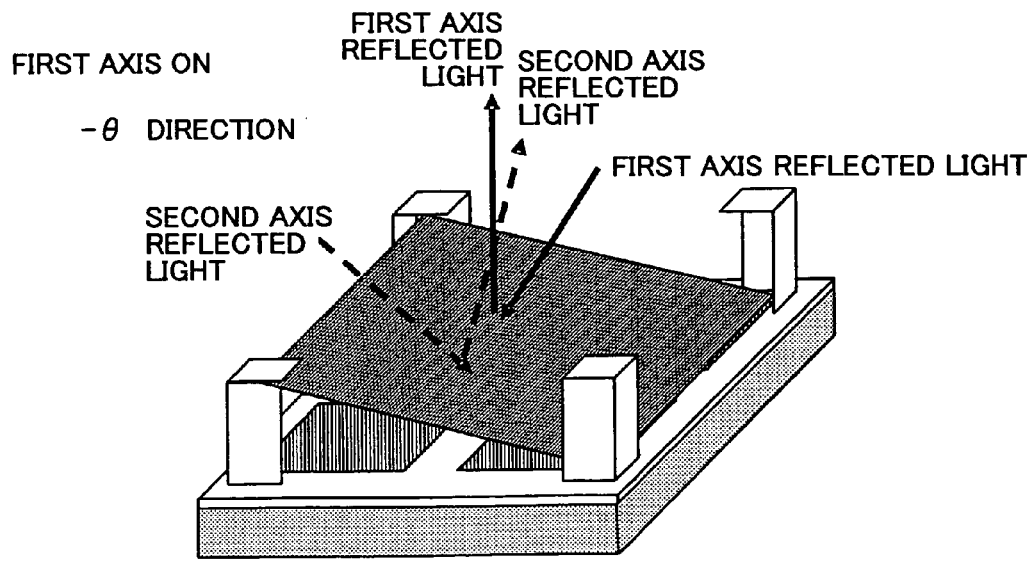
Figure 16A:
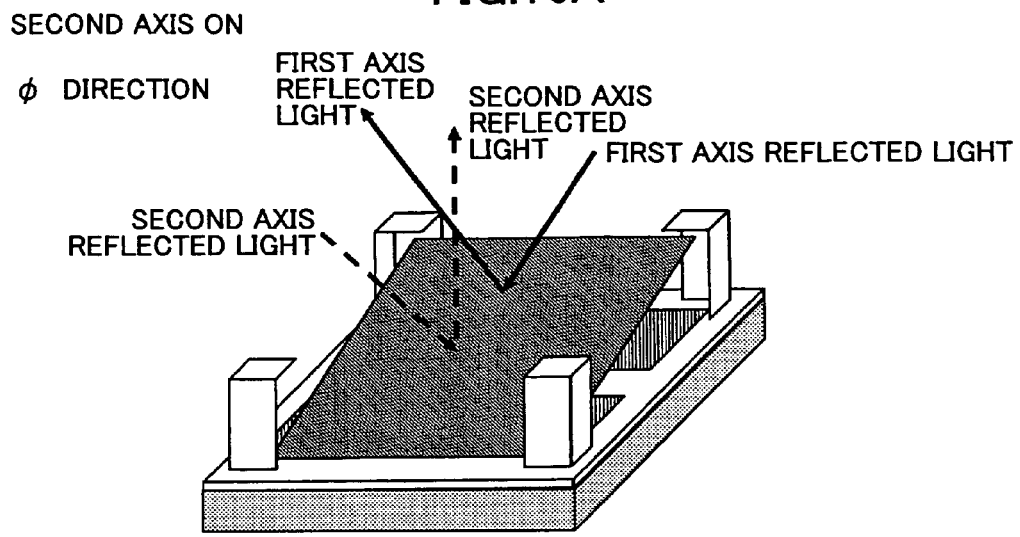
FIG. 16 is a diagram for explaining the optical deflection operation according to the second embodiment of the present invention.
Figure 16B:
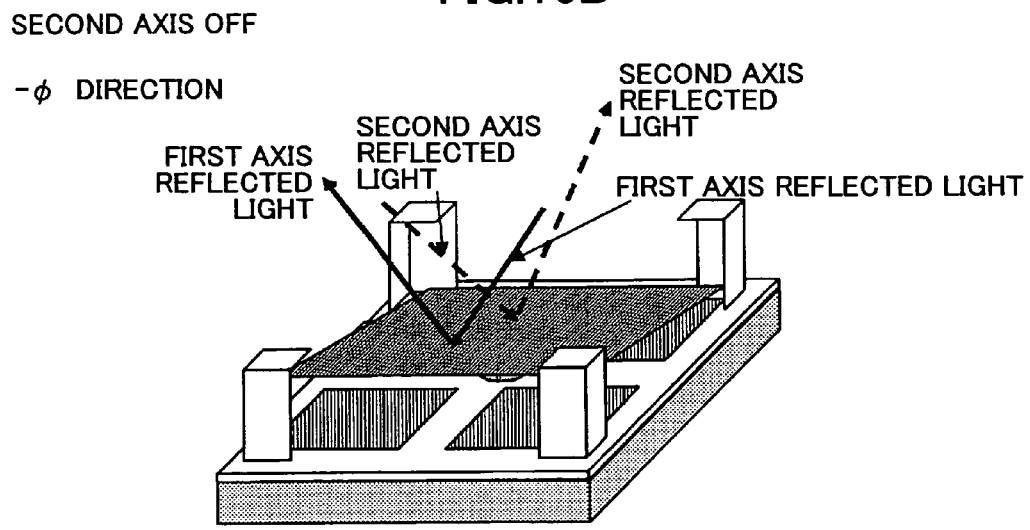

FIG. 13 is a diagram for explaining a configuration and an operation in a case of the two-axis operation. In FIG. 13, electrodes 103*a* through 103*d* are arranged on a substrate 101 through an insulation film 102, and the electrodes 103*a* through 103*d* are covered with another insulation film (not shown). In addition, the plate member 107*a* is mounted on the fulcrum member 106 serving as an electrode for a conductive layer of the plate member 107*a*. An apex of the electrode of the fulcrum member 106 exposes a conductor, and electrically contacts to the conductive layer 107*b* of the plate member 107*a*. Thus, it is possible to apply the electric potential to the conductive layer 107*b* of the plate member 107*a* from the electrode of the fulcrum member 106. The plate member 107*a* is controlled by a control member 108, so that the plate member 107*a* does not jump out.

The plate member 107*a* includes a light reflection area, and further includes the conductive layer 107*b*. A plurality of electrodes, an electrode a, an electrode b, an electrode c, and an electrode d are arranged to face to the plate member 107*a*. An electrode is electrically connected to the conductive layer 107*b* of the plate member 107*a* or establishes an electric potential. Moreover, an electrode configuration is not limited to the above-described configuration. Alternatively, for example, as shown in FIG. 14, an electrode arrangement and an inclination displacement of the plate member 107*a* can be configured. In any case, four electrodes are arranged at positions surrounding the fulcrum member 106. Furthermore, two electrodes adjacent to each other are set to be the same electric potential. Therefore, it is possible to switch an axis.

A light deflection operation will be described with reference to FIGS. 15A and 15B, and FIGS. 16A and 16B. A reflective surface of the plate member 107*a* is inclined by the fulcrum member 106. By inclining and entering an incoming light by an inclination angle to the plate member 107*a*, when the plate member 107*a* inclines, the incoming light is perpendicularly reflected at the substrate 101. In a case in that the plate member 107*a* inclines to an opposite side, the incoming light is not perpendicularly reflected at the substrate 101. By using an angle difference, it is defined that light is ON when the light is perpendicularly reflected to the substrate 101 and light is OFF when the light is reflected at a slant. Moreover, in a case of a two-axis operation, the inclination angles of four directions are generally the same. The incoming light inclined with respect to the plate member 107*a* is emitted from two directions in which the incoming light is displaced at 90° in a substrate plane, so as to switch two types of light by using inclination directions of the incoming light in the two directions.

In the second embodiment, the plate member 107*a* has 0.1 μm thickness, 10 μm square, and 12° inclination angle, and four electrodes having 4 μm square are used. In addition, the four electrodes a through d are symmetrically arranged and have the same area. For example, in a case in that the plate member 107*a* inclines to sides of the electrode and the electrode b, a ratio of the electrostatic force between the plate member 107*a* and the electrodes a and b to which the plate member 107*a* inclines, to the electrostatic force between the plate member 107*a* and the electrodes c and d which are distanced from the plate member 107*a* is approximately 100 times. Since force is proportional to a square of the voltage, a voltage ratio is a square root of the ratio of the electrostatic force. Then, in this case, the voltage root is 10 times. Since VH is 5V, when 0V is applied to the electrode a and the electrode b, and 5V is applied to the plate member 107*a*, the plate member 107*a* does not move to sides of the electrode c and the electrode d even if the voltage is applied to the electrode c and the electrode d until approximately 50V. The electric potential E is available until 50V.

The method for driving the optical deflecting device array according to the present invention can be applied not only for a configuration in which the plate member 107*a* is not fixed, but also for a configuration in which the plate member 107*a* is hung by a torsion beam or a like which has low stiffness and is not easily restored. In a case in that the stiffness and a restoration force of the torsion beam are lower, the inclination direction can be maintained at a side of a closer electrode by the electrostatic force due to an electric potential difference of VH between the plate member 107a and the closer electrode to the plate member 107a.

FIG. 17, FIG. 18, FIG. 19, FIG. 20, FIG. 21, FIG. 22, and FIG. 23 are diagrams for explaining operations in the state 1 (display and data write), the state 2 (inclination direction change of the plate member 107a), and the state 3 (restore of the plate member 107a) by using two axes, respectively. If E>VH and the electric potential difference between the plate member 107a and two electrodes at which the plate member 107a inclines is greater than VH, even though the electric potential between the plate member 107a and other two electrodes which are distanced from the plate member 107a is E, values of VH and E can be set so that the plate member 107a does not move.

Figure 17:
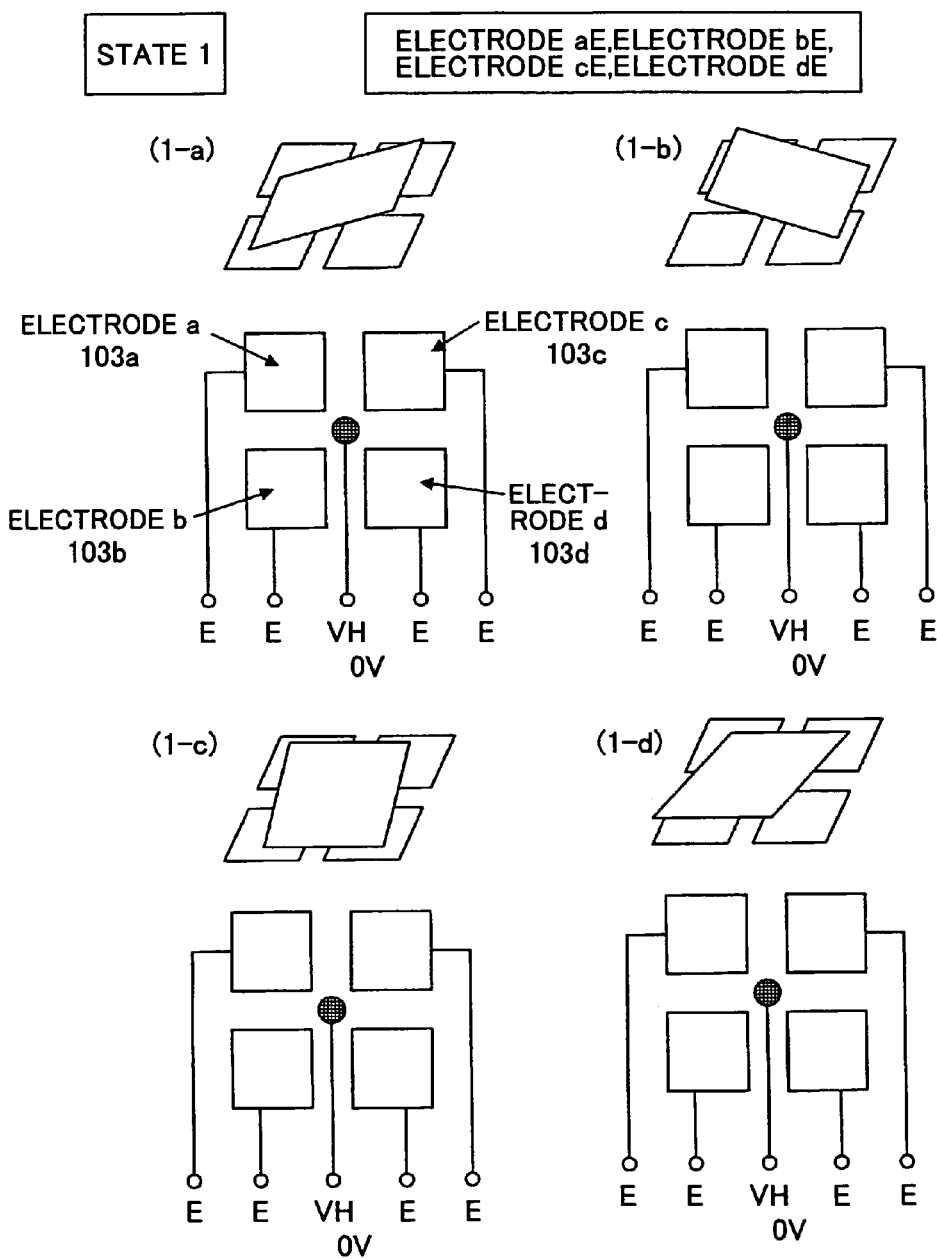
FIG. 17 is a diagram for explaining operations in a state 1 through a state 2 according to the second embodiment of the present invention.
Figure 19:
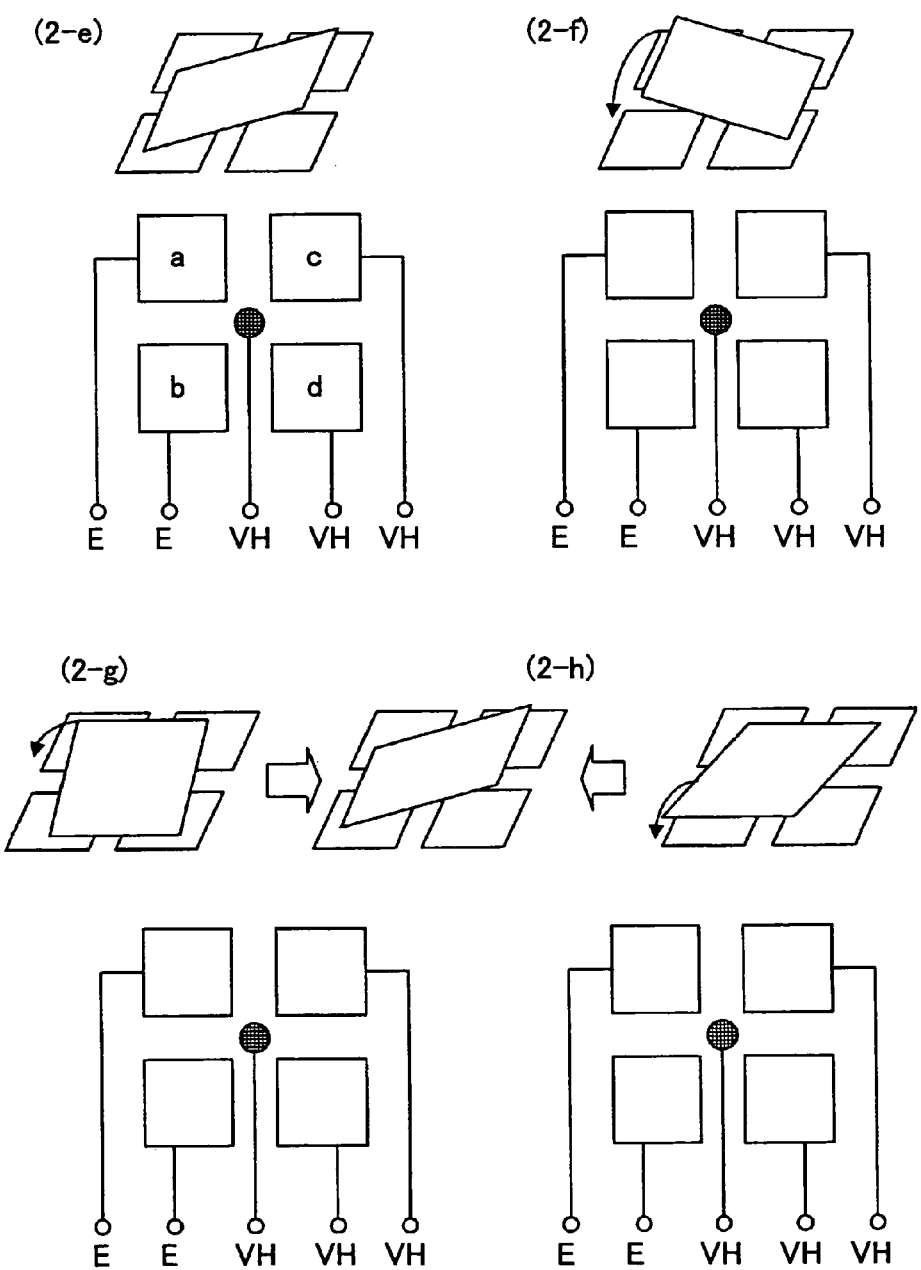
FIG. 19 is a diagram for explaining the operations in the state 1 through the state 2 according to the second embodiment of the present invention.

State 1 (electric potentials of the electrode a, the electrode b, the electrode c, and the electrode d are E): see FIG. 17

(1-a) when the plate member 107a inclines to the side of the electrode a and the electrode b, the electric potentials of the electrode a and the electrode b closer to the plate member 107a are E, and the electrostatic forces are greater. Accordingly, even if the electric potential of the plate member 107a is VH or 0V, the inclination direction can be maintained.

(1-b) when the plate member 107a inclines to the side of the electrode c and the electrode d, the electric potentials of the electrode c and the electrode d closer to the plate member 107a are E, and the electrostatic forces are greater. Accordingly, even if the electric potential of the plate member 107a is VH or 0V, the inclination direction can be maintained.

(1-c) when the plate member 107a inclines to the side of the electrode b and the electrode d, the electric potentials of the electrode b and the electrode d closer to the plate member 107a are E, and the electrostatic forces are greater. Accordingly, even if the electric potential of the plate member 107a is VH or 0V, the inclination direction can be maintained.

(1-d) when the plate member 107a inclines to the side of the electrode a and the electrode c, the electric potentials of the electrode a and the electrode c closer to the plate member 107a are E, and the electrostatic forces are greater. Accordingly, even if the electric potential of the plate member 107a is VH or 0V, the inclination direction can be maintained.

State 2 (electrode a: V3=E, electrode b: V3=E, electrode c: V4=VH, electrode d: V4=VH, and electric potential: V1 (condition 3)): see FIG. 18 and FIG. 19 The inclination direction is defined as a first inclination direction when the plate member 107a inclines to the side of the electrode a and the electrode b. In (2-a), (2-b), (2-c), and (2-d), V1=0V, and the electric potential difference between the plate member 107a and two electrodes to which the plate member 107a inclines is greater than VH. Accordingly, the electrostatic force works, and the inclination direction is maintained.

The inclination direction is defined as a second inclination direction when the plate member 107a inclines at the side of the electrode c and the electrode d and when the plate member 107a inclines at the side of the electrode b and the electrode d.

(2-a) the plate member 107a inclines in the first inclination direction. The electric potentials of the electrode a and the electrode b are V3=E, and F1 is greater. The electric potential difference between the electric potentials V4=V2=VH of the electrode c and the electrode d and the electric potential V1 of the plate member 107a is VH. The plate member 107a is distanced from the electrode c and the electrode d, and F2 is smaller. Accordingly, since F1>F2, the plate member 107a maintains inclining in the first inclination direction.

(2-b) the electric potential difference between the plate member 107a and the electric potential V3=E of the electrode a and the electrode b is E, but the plate member 107a is distanced from the electrode a and the electrode b and F1 is smaller. The electrostatic force F2 works due to the electric potential difference VH between the electric potential V1 of the plate member 107a and the electric potential V4=V2=VH of the electrode c and the electrode d. Since F1<F2, the plate member 107a maintains inclining in the second inclination direction.

(2-c) the electric potential of the electrode a is V3=E, but the plate member 107a is distanced from the electrode a and F1 is smaller. The electric potential difference between the electric potential V1 of the plate member 107a and the electric potential V4=V2=VH of the electrode d is VH, and the electrostatic force F2 works. Since F1<F2, the plate member 107a maintains inclining in the second inclination direction.

(2-d) the electric potential of the electrode b is V3=E, but the plate member 107a is distanced from the electrode b, and F1 is smaller. The electric potential difference between the electric potential V1 of the plate member 107a and the electric potential V4=V2=VH of the electrode c is VH, and the electrostatic force F2 works. Since F1<F2, the plate member 107a maintains inclining in the second inclination direction.

The electric potential of the plate member 107a is set to be V2 (condition 4).

(2-e) the plate member 107a inclines in the first inclination direction at the side of the electrode a and the electrode b. The electric potentials of the electrode a and the electrode b are V3=E, and the electric potential of the plate member 107a is V2=VH. Accordingly, the electric potential difference between the plate member 107a and the electrodes and the electrodes b is E−VH, and the electrostatic force F3 works. The electric potential difference between the electric potential V2=VH of the plate member 107a and the electric potential V4=V2=VH of the electrode c and the electrode d is 0V, and F4=0. Since F3>F4, the plate member 107a maintains inclining in the first inclination direction.

(2-f) the inclination direction is defined as the second inclination direction when the plate member 107a inclines to the side of the electrode c and the electrode d. The electric potentials of the electrode c and the electrode d is V4. Since the electric potential of the plate member 107a is V2=VH, the electric potential difference between the plate member 107a and the electrode c and the electrode d is 0V, and the electrostatic force F4=0. The electric potentials of the electrode a and the electrode b are V3, and the electric potential difference between the plate member 107a and the electrode a and the electrode b is E−VH. The plate member 107a inclines at the side of the electrode a and the electrode b due to the electrostatic force F3, and F3>F4.

(2-g) the inclination direction is defined as the second inclination direction when the plate member 107a inclines to the side of the electrode b and the electrode d. Since the electric potential of the plate member 107a is V2=VH, the electric potential difference between the plate member 107a and the electrode b is E−VH, and the electrostatic force pulling the plate member 107a to the side of the electrode b is greater. The electric potential of the electrode d is V4. The electric potential difference between the plate member 107a and the electrode d is 0V, and the electrostatic force is F4=0. Accordingly, the plate member 107a is not pulled toward the electrode. The electric potential of the electrode a is V3. The electric potential difference between the plate member 107a and the electrode a is E−VH, and the electrostatic force F3 works, and the plate member 107a inclines at the side of the electrode a. Therefore, the plate member 107a inclines to the side of the electrode a and the electrode b, and F3>F4.

(2-h) the inclination direction is defined as the second inclination direction when the plate member 107a inclines at the side of the electrode a and the electrode c. Since the electric potential of the plate member 107a is V2=VH, the electric potential difference between the plate member 107a and the electrode a is E−VH and the electrostatic force pulling the plate member 107a to the side of the electrode a is greater. The electric potential of the electrode c is V4. The electric potential difference between the plate member 107a and the electrode c is V, the electrostatic force if F4=0, and the plate member 107a is not pulled toward the electrode c. The electric potential of the electrode b is V3. The electric potential difference between the plate member 107a and the electrode b is E−VH, the electrostatic force F3, and the plate member 107a inclines at the side of the electrode b. Therefore, the plate member 107a inclines at the side of the electrode a, and the electrode b, and F3>F4.

State 3 (the first axis and the second axis are selected by combining the electrode a, the electrode b, the electrode a, and the electrode d): see FIG. 20, FIG. 21, FIG. 22, and FIG. 23.

Each case of the first axis and the second axis will be described.

The inclination direction is defined as the second inclination direction when the plate member 107a inclines to the side of the electrode c and the electrode d.

The inclination direction is defined as the first inclination direction when the plate member 107a inclines to the side of the electrode a and the electrode b or the side of the electrode a and the electrode c.

Condition 2: V1=V5

Condition 3:

(3-1-a) the inclination direction is defined as the first inclination direction when the plate member 107a inclines to the side of the electrode a and the electrode b. Since the electric potential of the plate member 107a is V1=0V, the electric potential difference is 0V between the electric potential V1 of the plate member 107a and the electric potential V5 of the electrode a and the electrode b, and the electrostatic force is F5=0. The electric potential of the plate member 107a is V1=0V, the electrostatic force F6 works at the side of the electrode c and the electrode d which are V6=E. Therefore, the plate member 107a inclines to the side of the electrode c and the electrode d, and F5<F6.

(3-1-b) the plate member 107a inclines in the second inclination direction at the side of the electrode c and the electrode d. The electric potential difference is 0V between the electric potential V1 of the plate member 107a and the electric potential V5 of the electrode a and the electrode b, and the electrostatic force F5=0. Since the electric potential of the plate member 107a is V1=0V, the electric potential difference between the plate member 107a and the electric potential V6 of the electrode c and the electrode d, and the plate member 107a maintains inclining to the side of the electrode c and the electrode d due to a greater electrostatic force. Therefore, F5<F6 when the plate member inclines in the second inclination direction.

(3-1-c) the inclination direction is defined as the first inclination direction when the plate member 107a inclines at the side of the electrode b and the electrode d. Since the electric potential of the plate member 107a is V1=0V, the electric potential difference is E between the electric potential V6 of the electrode d and the electric potential V1 of the plate member 107a, and the electrostatic power pulling the plate member 107a to the side of the electrode d is greater. The electric potential difference is 0V between the electric potential V5 of the electrode b and the electric potential V1 of the plate member, and F5 is 0 (zero). Accordingly, the plate member 107a is displaced away from the electrode b. The electric potential difference is E between the electric potential V4 of the electrode c and the electric potential V1 of the plate member 107a, the electrostatic force F6 works, and the plate member 107a inclines to the side of the electrode c. Accordingly, the plate member 107a inclines at the side of the electrode c and the electrode d, and F5<F6.

(3-1-d) the inclination direction is defined as the first inclination direction when the plate member 107a inclines to the side of the electrode a and the electrode c. Since the electric potential V1 of the plate member 107a is 0V, the electric potential difference is E between the electric potential V5 of the electrode c and the electric potential V1 of the plate member 107a, and the electrostatic power pulling the plate member 107a to the side of the electrode c is greater. The electric potential difference is 0V between the electric potential V5 of the electrode a and the electric potential V1 of the plate member 107a, V5 is 0 (zero), and the plate member 107a is displaced away from the electrode a. The electric potential difference is E between the electric potential V6 of the electrode d and the electric potential V1 of the plate member, the electrostatic force F6 works, and the plate member 107a inclines to the side of the electrode d. Accordingly, the plate member 107a inclines to the side of the electrode c and the electrode d, and F5<F6.

Condition 4:

In (3-1-e), (3-1-f), (3-1-g), and (3-1-h), the electric potential V2 of the plate member is VH (V2=VH), the electric potential difference is greater than VH between two electrodes at the side where the plate member 107a inclines, and the plate member 107a, and the electrostatic force works in the inclination direction. Accordingly, the inclination direction is maintained.

When the plate member 107a inclines to the side of the electrode a and the electrode b, or when the plate member 107a inclines to the side of the electrode a and the electrode c, the inclination direction is defined as the first inclination direction.

(3-1-e) the electric potentials V5 of the electrode a and the electrode b are 0V, electric potential difference is VH between the electric potentials V5 of the electrode a and the electrode b and the electric potential V2 of the plate member 107a, and the electrostatic force F7 works. The electric potentials V6 of the electrode c and the electrode d are E (V6=E), the electric potential difference is VH between the electric potentials V6 of the electrode c and the electrode d and the electric potential V2 of the plate member 107a, and the electrostatic force F8 works. The plate member 107a is distanced from the electrode b and the electrode d, and the electrostatic force F8 is smaller. Accordingly, F7>F8, and the plate member 107a maintains inclining in the first inclination direction.

(3-1-f) the plate member 107a inclines in the second inclination direction at the side of the electrode c and the electrode. The electric potential difference is VH between the electric potentials V5 of the electrode a and the electrode b and the electric potential V2 of the plate member 107a, the plate member 107a is distanced from the electrode a and the electrode b, and the electrostatic force F7 is smaller. The electric potential V6 of the electrode c and the electrode d is E (V6=E), the plate member 107a is closer to the side of the electrode c and the electrode d, and the electrostatic force F8 is greater. The plate member 107a maintains inclining in the second inclination direction at the side of the electrode c and the electrode d. When the plate member 107a inclines in the second inclination direction, F7<F8.

(3-1-g) the electric potential V5 of the electrode b is 0V, the electric potential difference is VH between the electric potential V5 of the electrode b and the plate member 107a of the electric potential V2, and the electrostatic force F7 works. The electric potential V6 of the electrode c is E (V6=E), the electric potential difference is VH between the electric potential V6 of the electrode c and the electric potential V2 of the plate member 107a, and the electrostatic force F8 works. The plate member is distanced from the electrode c, and the electrostatic force F8 is smaller. Accordingly, F7>F8, and the plate member 107a maintains inclining in the second inclination direction.

(3-1-h) the electric potential V5 of the electrode a is 0V, the electric potential difference is VH between the electric potential V5 of the electrode a and the electric potential V2 of the plate member 107a, and the electrostatic force F7 works. The electric potential V6 of the electrode d is E (V6=E), the electric potential difference is VH between the electric potential V6 of the electrode d and the electric potential V2 of the plate member 107a, and the electrostatic force F8 works. The plate member 107a is distanced from the electrode d, and the electrostatic force F8 is smaller. Accordingly, F7>F8, and the plate member 107a maintains inclining in the first inclination direction.

State 3: second axis (electrode a: 0V, electrode b: E, electrode c: 0V, electrode d: E)

Condition 3: the inclination direction is defined as the second inclination direction when the plate member 107a inclines at the side of the electrode b and the electrode d.

(3-2-a) the plate member 107a inclines at the side of the electrode a and the electrode b, and the inclination direction is defined as the first inclination direction. The electric potential V1 of the plate member 107a is 0V (V1=0V), the electric potential difference is E between the electrode b and the plate member1 107a, and the electrostatic force pulling the plate member 107a to the side b is greater. The electric potential difference is 0V between the electric potential V5 of the electrode a and the electric potential V1 of the plate member 107a, the electrostatic force F5 is 0 (F5=0), and the plate member 107a is displaced away from the electrode a. The electric potential difference is E between the electric potential V6 of the electrode d and the electric potential V1 of the plate member 107a, the electrostatic force F6 works, the plate member 107a inclines at the side of the electrode d. Accordingly, the plate member 107a inclines at the side of the electrode b and the electrode d, and F5<F6.

(3-2-b) the plate member 107a inclines at the side of the electrode c and the electrode d, and the inclination direction is defined as the second inclination direction. Since the electric potential V1 of the plate member 107a is 0V (V1=0V), the electric potential difference is E between the electrode d and the plate member 107a, and the electrostatic force pulling the plate member 107a to the side of the electrode d is greater. The electric potential difference is 0V between the electric potential V5 of the electrode c and the electrode V1 of the plate member 107a, the electrostatic force F5 is 0 (F5=0), the plate member 107a is displaced away from the electrode c. The electric potential difference is E between the electric potential V6 of the electrode b and the electric potential V1 of the plate member 107a, the electrostatic force F6 works, the plate member 107a inclines at the side of the electrode b. Accordingly, the plate member 107a inclines at the side of the electrode b and the electrode d, and F5<F6.

(3-2-c) the plate member 107a inclines at the side of the electrode a and the electrode c, and the inclination direction is defined as the first inclination direction. The electric potential V1 of the plate member 107a is 0V (V1=0V), the electric potential difference is 0V between the electric potential V1 of the plate member and the electric potential V6 of the electrode c, and the electrostatic force F5 is 0 (F5=0). The electric potential difference is E between the electric potentials V6 (=E) of the electrode b and the electrode d and the electric potential V1 of the plate member 107a, and the plate member 107a inclines at the side of the electrode b and the electrode d due to the electrostatic force F6.

(3-2-d) the plate member 107a inclines the side of the electrode b and the electrode d, and the inclination direction is defined as the second inclination direction. The electric potential V1 of the plate member 107a is 0V (V1=0V), the electric potential difference is 0V between the electric potentials V5 (=0V) of the electrode a and the electrode c, and the electrostatic force F5 is 0 (F5=0). The electric potential difference is E between the electric potentials V4 (=E) of the electrode b and the electrode d and the electric potential V1 of the plate member 107a. Accordingly, the plate member 107a maintains inclining at the side of the electrode b and the electrode d due to the electrostatic force F6, and F5<F6.

Condition 4:

In (3-2-e), (3-2-f), (3-2-g), and (3-2-h), the electric potential V2 of the plate member 107a is VH (V2=VH), and the electric potential difference is more than VH between the side of two electrodes at which the plate member 107a inclines, and the plate member 107a. Accordingly, the electrostatic force works and the inclination direction is maintained. The inclination direction is defined as the first inclination direction when the plate member 107a inclines at the side of the electrode a and the electrode b. The inclination direction is defined as the second inclination direction when the plate member 107a inclines at the side of the electrode c and the electrode d or when the plate member 107a inclines at the side of the electrode b and the electrode d.

(3-2-e) the electric potential V5 of the electrode a is 0V (V5=0V), the electric potential difference is VH between the electric potential V5 of the electrode a and the electric potential V2 of the plate member 107a, and the electrostatic force F7 works. The electric potential difference is E−VH between the electric potential V6 (=E) of the electrode d and the electric potential V2 of the plate member 107a, the electrostatic force F8 works. The plate member 107a is distanced from the electrode d, and the electrostatic force F8 is smaller. Accordingly, F7>F8, and the plate member 107a maintains inclining in the first inclination direction.

(3-2-f) the electric potential V5 of the electrode c is 0V, the electric potential difference is VH between the electric potential V5 of the electrode c and the electric potential V2 of the plate member 107a, and the electrostatic force F7 works. The electric potential difference is E−VH between the electric potential V6 (=E) of the electrode b and the electric potential V2 of the plate member 107a, and the electrostatic force F8 works. The plate member 107a is distance from the electrode d, and the electrostatic force F8 is smaller. Accordingly, F7>F8, and the plate member 107a maintains inclining in the second inclination direction.

(3-2-g) the plate member 107a inclines in the second inclination direction at the side of the electrode b and the electrode d. The electric potential difference is VH between the electric potentials V5 of the electrode a and the electrode c and the electric potential V2 of the plate member 107a, the plate member 107a is distanced from the electrode a and the electrode c, and the electrostatic force F7 is smaller. The electric potentials V6 (=E) of the electrode b and the electrode d, the plate member 107a is closer to the side of the electrode b and the electrode d, and the electrostatic force F8 is greater. The plate member 107a maintains inclining in the second inclination direction at the side of the electrode b and the electrode d. When the plate member 107a inclines in the second inclination direction, F7<F8.

(3-2-h) the electric potential V5 of the electrode a and the electrode c is 0V, the electric potential difference is VH between the electric potential V5 of the electrode a and the electrode c and the electric potential V2 of the plate member 107a, the electrostatic force F7 works. The electric potential difference is VH between the electric potentials V6 of the electrode b and the electrode d is E (V6=E) and the electric potential V2 of the plate member 107a, and the electrostatic force F8 works. The plate member 107a is distanced from the electrode b and the electrode d, and the electrostatic force F8 is smaller. Accordingly, F7>F8, and the plate member 107a maintains inclining in the first direction.

As described above, in the state 1, regardless of the electric potential 0V or VH of the plate member 107a, the inclination direction of the plate member 107a is maintained. Accordingly, if data are written in this state, the inclination direction is not changed. In the state 2, the electric potential of the plate member 107a is VH, and the inclination direction of the plate member 107a changes to the side of the electrode a and the electrode b, and returns. In the state 3, the electric potential of the plate member 107a is 0V, and the inclination direction of the plate member 107a is changed to the side of the electrode c and the electrode d by an electric potential for the first axis or to the side of the electrode b and the electrode d by an electric potential for the second axis.

Figure 24:
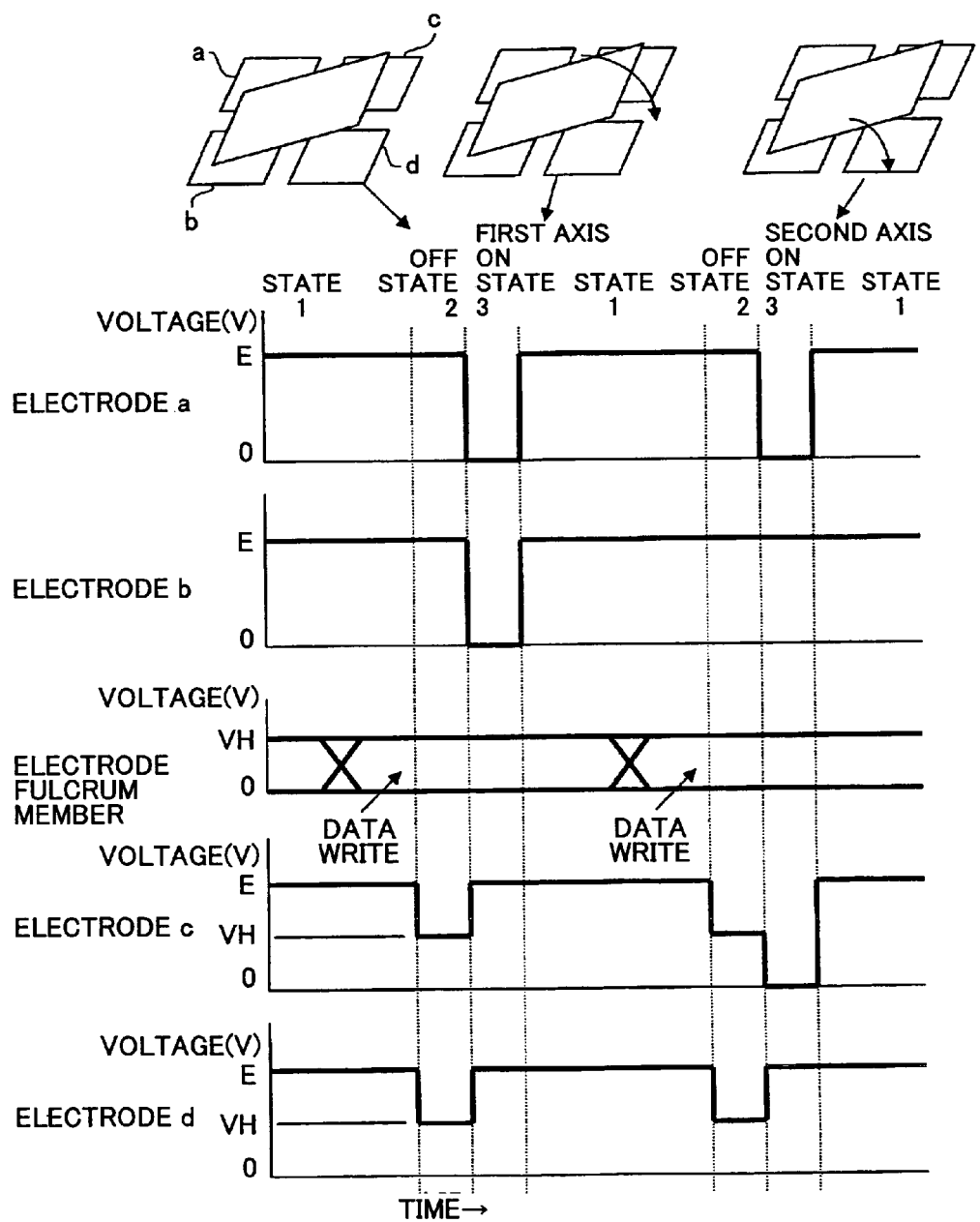
FIG. 24 is a diagram showing a timing chart according to the second embodiment of the present invention.

FIG. 24 is a diagram showing a timing chart. From an upper row, a change of the electric potential of the electrode a in a time sequence, a change of the electric potential of the electrode b in the time sequence, a change of the electric potential applying to the plate member 107a by the fulcrum member 106, a change of the electric potential of the electrode c in the time sequence, and a change of the electric potential of the electrode c in the time sequence are shown.

A state transition in an order of the state 1, the state 2, the state, 3, and the state 1 will be described. When the plate member 107a inclines at the side of the electrode a and the electrode c, light is OFF. When the plate member 107a inclines at the side of the electrode c and the electrode d, the light is ON by a first axis. When the member plate 107a inclines at the side of the electrode b and the electrode d, the light is ON by a second axis.

A lateral axis shows the time sequence. A longitudinal axis shows the electric potential. In FIG. 24, a case of a display by the second axis after the display by the first axis is shown. However, the first axis or the second axis can be arbitrarily selected. Alternatively, the state transition can be conducted in an order of the state 1, the state 3, the state 2, and the state 1.

In the state 1, an image is displayed. Simultaneously, data for displaying in a next state 1 are prepared in a memory connected to the fulcrum member 106, and the electric potential 0V or VH is applied to the plate member 107a in accordance with image information.

In the state 2, since the electric potential of the plate member 107a is VH, the plate member 107a inclines at the side of the electrode a and the electrode b or maintains inclining in the inclination direction at this point.

In the state 3, if the electric potential of the plate member 107a is 0V, the plate member 107a inclines at the side of the electrode c and the electrode d or the side of the electrode b and the electrode d in accordance with the first axis or the second axis. As shown in FIG. 20, FIG. 21, FIG. 22, and FIG. 23, an indication of the first axis or the second axis can be switched by combining the electrode a, the electrode b, the electrode c, and the electrode d. If the electric potential of the plate member 107a is VH, the inclination direction in the state 2 is maintained. Data are written and an image is displayed in the state 1 (the inclination direction is maintained), the plate member 107a inclines to the OFF side in the state 2, and the inclination direction of the plate member 107a is changed by the data, that is, the image is displayed in the state 3. Next, the inclination direction of the plate member 107a is maintained and the image is displayed in the state 1. During the state 1, next data are supplied from the memory. However, the inclination direction of the plate member 107a is not changed.

As described above, a series of flow is formed. For a minimum display time, 32 μsec. is set for the state 1. In the optical deflecting device, since a rising time is approximately 3 μsec., 3 μsec. is set for the state 2 and the state 3, respectively.

Third Embodiment

In a case in that a plurality of an optical deflecting devices are formed in one dimension or in two dimensions, electrodes among the plurality of optical deflecting devices forming pixels, for example, every electrode a is connected among the plurality of optical deflecting devices, and every electrode b, every electrode c, and every electrode d are connected similarly among the plurality of optical deflecting devices. In particular, in a case of connecting the electrodes of the optical deflecting device array in the two dimensions for each of four types, four power sources are used.

Figure 25:
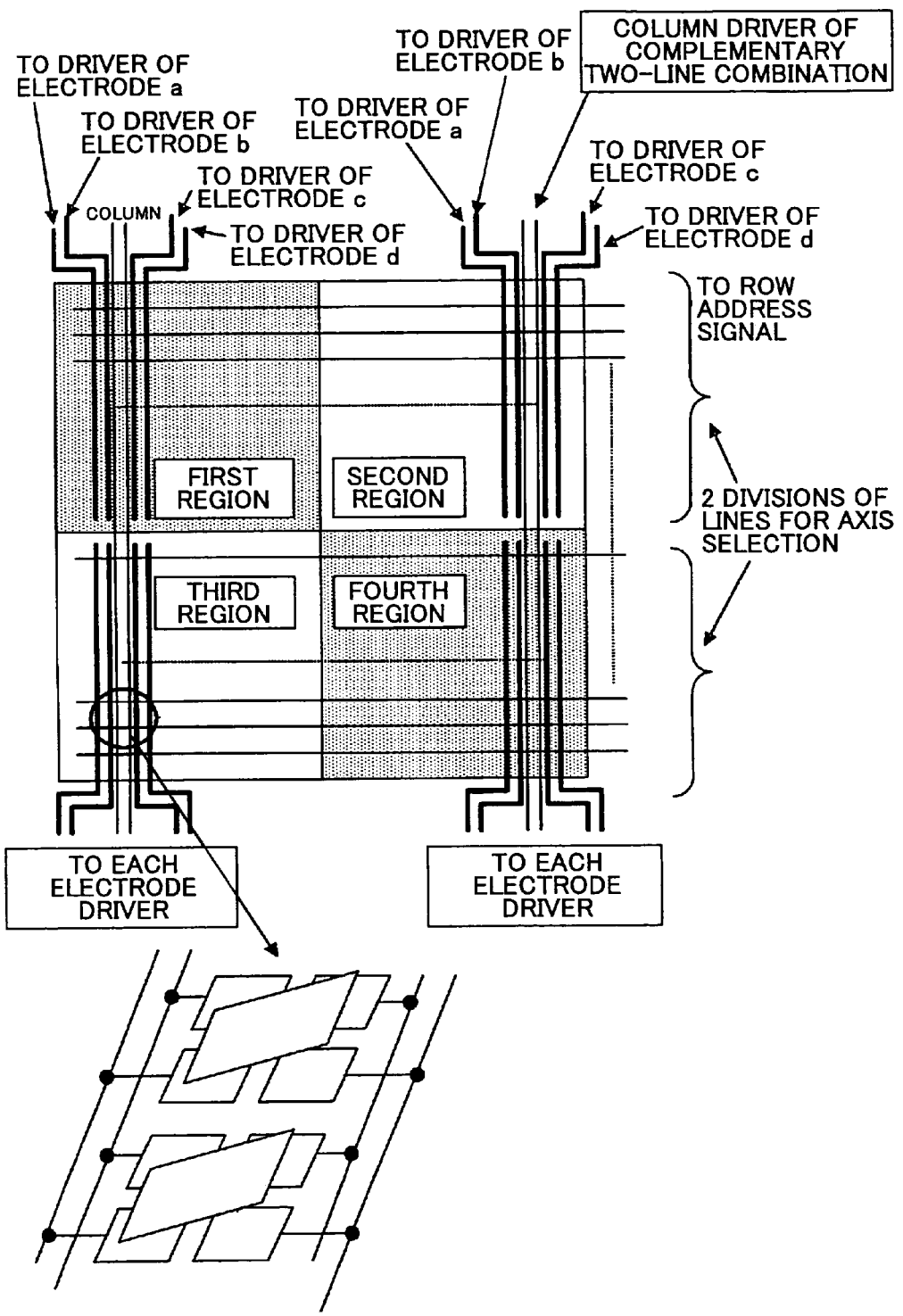
FIG. 25 is a diagram showing a configuration according to a third embodiment of the present invention.

FIG. 25 is a diagram showing an example of a region division. In FIG. 25, a line represents a wire. For example, at each intersection point of lines from a column driver and lines from a row driver, a semiconductor memory device such as an SRAM (Static Random Access Memory) is arranged. On an upper layer, the optical deflecting device according to the present invention including a electrode group and a plate member 107a is formed. As shown in FIG. 25, a region pointed by an address is divided, so as to switch outputs of light of the first axis and light of the second axis.

In the third embodiment, a case of dividing the region into four regions is illustrated as a region 1, a region 2, the region 3, and a region 4. The electrode a, the electrode b, the electrode c, and the electrode d are connected, respectively, in the region 1, the region 2, the region 3, and the region 4. A driving power source is arranged with respect to each of the region 1, the region 2, the region 3, and the region 4. Sixteen power sources cover the entire for a total of four regions. As described above, the optical deflection can be conducted by switching an axis for each of the four regions.

Fourth Embodiment

Figure 26:
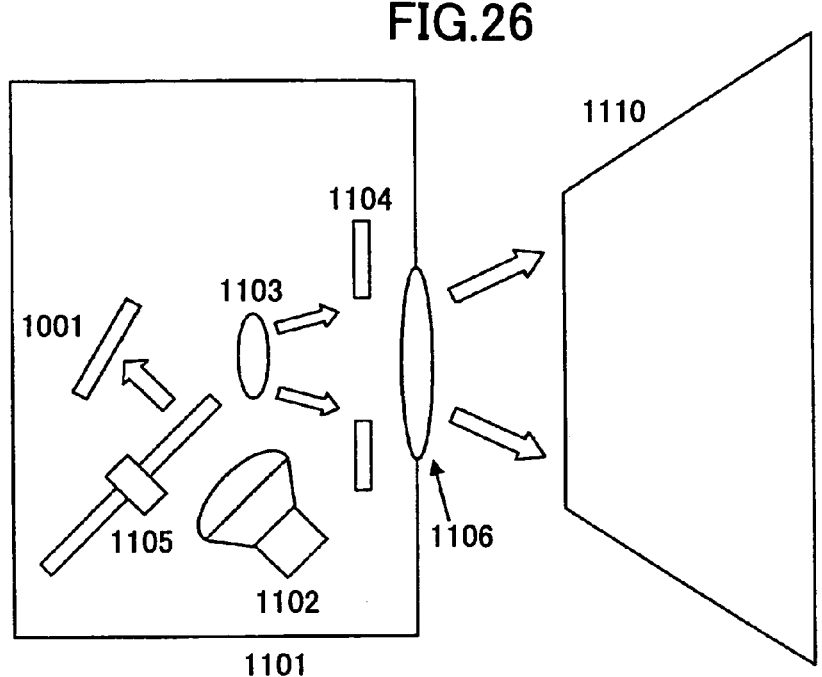
FIG. 26 is a diagram showing a configuration according to a fourth embodiment of the present invention.

FIG. 26 is a diagram showing a configuration of a projection apparatus 1101 using an optical deflecting device 1001 according to the present invention and applying a method for driving the optical deflecting device 1001. Light having a certain wider angle from a light source 1102 is illuminated to the optical deflecting device 1001, for example, through a rotation color filter 1105. Reflected light from the reflection area of the plate member 107a is illuminated on a projection screen 1110 through a projection lens 1106 in a case of a first inclination direction of the plate member 107a. This state is an ON state. On the other hand, in a case of a second inclination direction, reflected light is blocked by a light shielding member 1104 as an aperture and does not output light to the projection screen 1110. This state is an OFF state.

In a case in that the plurality of the optical deflecting devices are arranged in the two dimensional array, by the ON state and the OFF state, it is possible to form an image on the projection screen 1110. The optical deflecting device 1001 can be used as an optical switch means of a display apparatus (that is, an apparatus for a contrast display of a pixel) for image projection data. Accordingly, a contrast control of a pixel (that is, ON/OFF control of an optical switch) becomes preferable, stray light (reflected light from an adjacent pixel occurred when the reflection direction is displaced) can be controlled, an operation can be conducted at higher speed, higher reliability can be realized in a long-term, a lower voltage can drive the optical deflecting device, and a contrast ratio can be improved.

Fifth Embodiment

Figure 27:
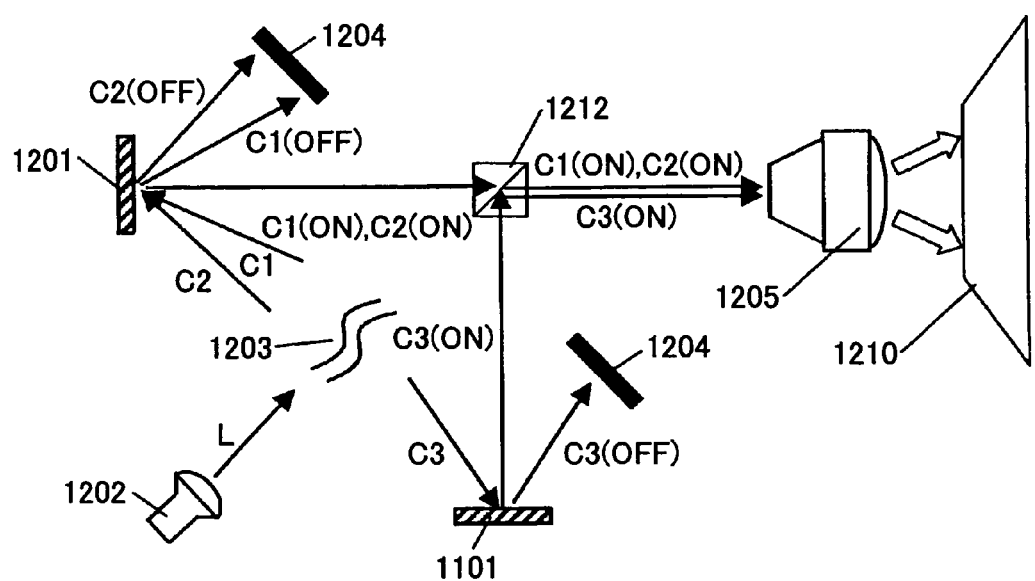
FIG. 27 is a diagram showing a configuration according to a fifth embodiment of the present invention.

FIG. 27 is a diagram showing a configuration of a projection apparatus using a two-axis optical deflecting device. The two-axis optical deflecting device 1201 and a one-axis optical deflecting device 1101 are used. Light from a light source 1202 is illuminated to the two-axis optical deflecting device 1201 and the optical deflecting device 1101 as incoming light C1, C2, and C3 by an optical system 1203 configured by a mirror, a lens and a like.

As described in FIG. 15 and FIG. 16, angles of the incoming light C1, C2, and C3 reflected at a plate member being inclined are defined so that the incoming light C1, C2, and C3 are perpendicularly reflected with respect to a substrate of the optical deflecting device. In particular, the incoming light C1 and C2 are set to be different by 90° in a plane surface of the substrate of the two-axis optical deflecting device 1201. The incoming light C1 is an incoming light flux of an arbitrary color, light C1 (ON) is a reflected light flux (hereinafter, called an ON light) being led to a projection lens 1205 when the ON operation is conducted for the arbitrary color, and light C1 (OFF) is a reflected light flux (hereinafter, called an OFF light) being led to a light absorption plate 1204 displaced away from the projection lens 1205 when the OFF operation is conducted. The incoming light C2 is an incoming light flux of an arbitrary color different from the arbitrary color of the incoming light C1, light C2 (ON) is the ON light of the arbitrary color, and light C2 (OFF) is the OFF light of the arbitrary color. The incoming light C3 is an incoming light flux of an arbitrary color different from the arbitrary colors of the incoming light C1 and the incoming light C2, light C3 (ON) is the ON light of the arbitrary color, and light C3 (OFF) is the OFF light of the arbitrary color. For example, each of the incoming light C1, C2, and C3 is one of three primary colors (red, green, and blue), or is a color having a different wavelength. Each of the incoming light C1, C2, and C3 is shown by a black arrow. In practice, each of the incoming light C1, C2, and C3 is a light beam having a width possible to illuminate the entire surface of an optical deflecting device array.

For example, the light source 1202 is a white color light source such as a xenon lamp, a halogen lamp, a mercury lamp, or a like. The optical system 1203 combining the optical lens and the mirror is illustratively shown by waved lines in order to avoid an intricate drawing. As a combination, for example, the optical system 1203 may include an IR cut mirror or an IR cut filter for cutting infrared light, an integrator lens or a rod lens for changing light from the light source 1202 to parallel light, a dichroic mirror or a dichroic prism for separating a target color from the white color source, and a total reflection mirror or a TIR prism for changing an illumination direction for each color to illuminate the optical deflecting device array. The optical system 1203 mainly separates light L from the light source 1202 into the incoming light fluxes C1 and C2 of arbitrary colors, and changes directions of the incoming light fluxes C1 and C2 to illuminate the optical deflecting device array. Thus, the above-described combination can easily achieve an purpose of the optical system 1203.

It is possible to combine three-different colors by combining the light C1 (ON), the light C2 (ON), and the light C3 (ON) by the color combination prism 1212. Therefore, it is possible to display an image on a screen 1210 with high color tone through the projection lens 1205.

The following advantages can be considered by applying the two-axis optical deflecting device to a projection apparatus. That is, in a case of using an one-axis optical deflecting device of a single plate type, a switch time of the one-axis optical deflecting device is assigned for each color in a time sharing by using a color wheel. In this configuration, there is a problem called a color break in that a color disturbance occurs in a rapid motion picture.

On the other hand, in the method for driving the optical deflecting device array according to the present invention, two types of light can be deflected by a two-axis operation. For example, a color switch can be realized for the entire surface of the two-axis optical deflecting device array, ½ screen, or ¼ screen, and each color can be evenly mixed. Therefore, it is possible to significantly suppress the color break.

For example, in an image projection apparatus using a plurality of deflecting devices arranged in an array, in a case of an optical deflecting device including a plate member having a torsion beam, it is difficult to minimize the torsion beam and then, it is difficult to minimize the pixels in order to refine precision of a pixel. On the other hand, it is easy to minimize the optical deflecting device in a configuration using a plate member without having a fixed portion. In the method for driving the optical deflecting device array, it is possible to control a drive of the plate member without the fixed portion by an operation voltage of a semiconductor memory device such as an LSI which is typical and is highly integrated, and it is possible to easily minimize the plate member in order to improve the precision. In addition, it is possible to use a higher driving voltage to realize an operation of the plate member at higher speed.

In particular, in a case of conducting a gradation display during the ON light or the OFF light by switching light emitted from the light source by using the reflection area of the plate member, when pixel data is sent to the semiconductor memory device for storing display data of the optical deflecting device within a minimum display period, the optical deflecting device forming a pixel in an array simultaneously switches light. Therefore, the minimum display period cannot be influenced by a switch time.

In the present invention, in a case of arranging a plurality of the optical deflecting device in an one dimension or in a two dimensions, electrodes of the same type and the same position are wired in common for the optical deflecting devices, so that only the number of power sources corresponding to the number of types of the electrodes can supply power entirely, and the number of power sources can be reduced. In addition, it is possible to switch an axis direction for each region, and it is possible to switch a color if a light color is different between a first axis and a second axis.

In the present invention, by forming the optical deflecting device on or adjacent to the semiconductor memory device, it is possible to shorten the wires, there is no interference among a plurality of the optical deflecting devices, and it is possible to reduce the number of wiring lines. In addition, it is possible to record image data to the semiconductor memory device, and to simultaneously deflect light by the plurality of the optical deflecting devices in the array. Therefore, a deflection switch time does not influence the display time length.

In the present invention, by using an SRAM as the semiconductor memory device, it is possible to certainly record the image data. In addition, it is possible to reduce the number of transistors in a configuration of the semiconductor memory device. Therefore, it is possible to easily minimize a pixel without increasing a range of the plate member.

In the present invention, a distance between the plate member and an electrode group to which the plate member is close becomes even closer, and the electrostatic force becomes even stronger per electric potential difference. Therefore, it is possible to maintain the distance between the plate member and the electrode group even if a voltage is lower, and it is possible to reduce a control voltage of the plate member. Alternatively, it is possible to make the driving voltage of the plate member to be higher.

In the present invention, it is possible to change to one of four inclination directions by approximately 90° in a plain surface of the substrate by switching electric potentials of four electrodes surrounding the fulcrum member. Accordingly, it is possible to switch the two-axis direction of light. By this configuration, for example, in a case of applying the present invention to an image projection displaying apparatus, it is possible to individually change the inclination direction with respect to a plurality of regions forming a display area of a plurality of colors. Therefore, it is possible to smoothly change a color display.

In the present invention, electric potentials of two electrodes in the rotation axis of the plate member and a parallel direction are set to be the same. Therefore, it is possible to stably rotate since an electrostatic force between both two electrodes and the plate member becomes the same.

According to the present invention, the contrast control of the pixel can be preferable by the ON/OFF control of the optical deflecting device, the operation can be conducted at higher speed, higher reliability can be realized in a long-term, a lower voltage can drive the optical deflecting device, and a contrast ratio can be improved. Therefore, it is possible to provide the image projection displaying apparatus with higher precision having a higher contrast ratio with having higher brightness.

The present invention is not limited to the specifically disclosed embodiments, and variations and modifications may be made without departing from the scope of the present invention.

The present application is based on the Japanese Priority Applications No. 2004-320821 filed on Nov. 4, 2004, the entire contents of which are hereby incorporated by reference.

What is claimed is:

1. A method for driving an optical deflecting device array, which arranges a plurality of optical deflecting devices in one dimension or in two dimensions, each of the plurality of optical deflecting devices in which a plate member having a light reflection area rotates on a rotation axis or a fulcrum being as a center, and a light deflection operation is conducted by changing a reflection direction of an incoming light flux in that the plate member includes a conductive layer, an electrode is contacted or fixed to the conductive layer to apply an electric potential, and each of the plurality of optical deflecting device includes an electrode group including a plurality of electrodes arranged to face to the plate member, and switching an inclination direction of the plate member due to an electrostatic attraction caused by an electric potential difference between an arbitrary electrode in the electrode group and the electrode applying the electric potential to the conductive layer, said method comprising:

in a series of processes for the light deflection operation, at least, a state of a first stage writing and recording data for indicating an inclination direction of the plate member to incline in a first inclination direction or a second inclination direction, into a semiconductor memory device arranged immediately under or adjacent to each of the plurality of optical deflecting devices;

a state of a second stage switching the inclination direction of the plate member of the arbitrary optical deflecting device to the first inclination direction based on an indication of the data, and deflecting light; and a state of a third stage switching the inclination direction of the plate member of the arbitrary optical deflecting device to the second inclination direction based on the indication of the data, and deflecting light.

2. The method for driving the optical deflecting device as claimed in claim 1, wherein the state of the first stage is conducted for each of the optical deflecting devices forming the optical deflecting device array at a different time, the state of the second stage and the state of the third stage are conducted at the plurality of the optical deflecting devices at one time.

3. The method for driving the optical deflecting device array as claimed in claim 1, wherein a switch of the inclination direction in the state of the second stage is conducted by applying an electric potential which satisfies a condition 1, a condition 2, and a condition 3, wherein:

the condition 1 is a condition for selecting an electric potential V1 or an electric potential V2 for each of the optical deflecting devices based on data for indicating the inclination direction in which the electric potential V1 or the electric potential V2 is applied to the electrode contacted or fixed to the conductive layer formed to the plate member;

the condition 2 is a condition in which an electric potential V3 is applied to at least one electrode arranged at a side of the first inclination direction with respect to the rotation axis or the fulcrum being as the center from the electrode group arranged to face to the plate member, an electric potential V4 approximately equivalent to an electric potential V2 is applied to at least one electrode arranged at a side of the second inclination direction with respect to the rotation axis or the fulcrum being as the center, and the electric potential V3 and the electric potential V4 are applied to the plurality of optical deflecting devices at one time with the same electric potential, the condition 3 is a condition in which an electrostatic attraction F1 occurred due to an electric potential difference between the electric potential V3 of the electrode arranged at the side of the first inclination direction and the electric potential V1 of the conductive layer formed to the plate member has a magnitude relation with an electrostatic attraction F2 occurred due to an electric potential difference between the electric potential V4 of the electrode arranged at the side of the second inclination direction and the electric potential V1 of the electrode arranged at the side of the second inclination direction:

F1>F2 when the plate member inclines in the first inclination direction at an initial state; and F1<F2 when the plate member inclines in the second inclination direction at an initial state, and the condition 4 is a condition in which an electrostatic attraction F3 occurred due to an electric potential difference between the electric potential V3 of the electrode arranged at the first inclination direction and the electric potential V2 of the conductive layer formed to the plate member has a magnitude relation with an electrostatic attraction F4 occurred due to an electric potential difference between the electric potential V4 of the electrode arranged at the second inclination direction and the electric potential V2 of the conductive layer formed to the plate member:

F3>F4 when the plate member inclines in the first inclination direction at an initial state; and F3>F4 when the plate member inclines in the second inclination direction at the initial state.

4. The method for driving the optical deflecting device array as claimed in claim 1, wherein a switch of the inclination direction in the state of the third stage is conducted by applying an electric potential which satisfies a condition 1, a condition 2, and a condition 3, wherein:

the condition 1 is a condition for selecting the electric potential V1 or the electric potential V2 for each of the optical deflecting devices based on data for indicating the inclination direction in which the electric potential V1 or the electric potential V2 is applied to the electrode contacted or fixed to the conductive layer formed to the plate member;

the condition 2 is a condition in which an electric potential V5 approximately equivalent to the electric potential V1 is applied to at least one electrode arranged at a side of the first inclination direction with respect to the rotation axis or the fulcrum being as the center from the electrode group arranged to face to the plate member, an electric potential V6 is applied to at least one electrode arranged to the side of the second inclination direction with respect to the rotation axis or the fulcrum being as the center, and the electric potential V5 and the electric potential V6 are applied to the plurality of optical deflecting devices at one time with the same electric potential, the condition 3 is a condition in which an electrostatic attraction F5 occurred due to an electric potential difference between the electric potential V5 of the electrode arranged at the side of the first inclination direction and the electric potential V1 of the conductive layer formed to the plate member has a magnitude relation with an electrostatic attraction F6 occurred due to an electric potential difference between the electric potential V6 of the electrode arranged at the side of the second inclination direction and the electric potential V1 of the electrode arranged at the side of the second inclination direction:

F5<F6 when the plate member inclines in the first inclination direction at the initial state; and F5<F6 when the plate member inclines in the second inclination direction at the initial state, and the condition 4 is a condition in which an electrostatic attraction F7 occurred due to an electric potential difference between the electric potential V5 of the electrode arranged at the first inclination direction and the electric potential V2 of the conductive layer formed to the plate member has a magnitude relation with an electrostatic attraction F7 occurred due to an electric potential difference between the electric potential V6 of the electrode arranged at the second inclination direction and the electric potential V2 of the conductive layer formed to the plate member:

F7>F8 when the plate member inclines in the first inclination direction at the initial state; and F7>F8 when the plate member inclines in the second inclination direction at the initial state.

* * * * *